United States Patent
Kim et al.

(10) Patent No.: US 8,624,897 B2
(45) Date of Patent: Jan. 7, 2014

(54) METHOD AND APPARATUS FOR AUTOMATIC TRANSFORMATION OF THREE-DIMENSIONAL VIDEO

(75) Inventors: Yong-tae Kim, Seoul (KR); Sang-hyoun Kim, Seoul (KR); Dae-sik Kim, Hwaseong-si (KR); Jong-sul Min, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 722 days.

(21) Appl. No.: 12/821,600

(22) Filed: Jun. 23, 2010

(65) Prior Publication Data

US 2010/0321390 A1    Dec. 23, 2010

Related U.S. Application Data

(60) Provisional application No. 61/219,438, filed on Jun. 23, 2009.

(30) Foreign Application Priority Data

Aug. 25, 2009   (KR) .................. 10-2009-0078841

(51) Int. Cl.
G06T 15/10  (2011.01)
G06T 15/20  (2011.01)
G06T 15/00  (2011.01)

(52) U.S. Cl.
USPC .......................................... 345/427; 345/419

(58) Field of Classification Search
None
See application file for complete search history.

(56) References Cited

U.S. PATENT DOCUMENTS

| | | | |
|---|---|---|---|
| 2002/0009137 A1 | 1/2002 | Nelson et al. | |
| 2004/0027267 A1* | 2/2004 | Rousso | 342/1 |
| 2004/0044657 A1* | 3/2004 | Lee | 707/3 |
| 2005/0117637 A1 | 6/2005 | Routhier et al. | |
| 2006/0062490 A1* | 3/2006 | Ha et al. | 382/298 |
| 2006/0177124 A1* | 8/2006 | Ha | 382/154 |

FOREIGN PATENT DOCUMENTS

| | | |
|---|---|---|
| EP | 1024672 A1 | 8/2000 |
| EP | 1596609 A2 | 11/2005 |
| JP | 8-331599 A | 12/1996 |
| JP | 2006-332985 A | 12/2006 |

OTHER PUBLICATIONS

International Search Report (PCT/ISA/220) dated Feb. 28, 2011, issued in International Application No. PCT/KR2010/004079.

(Continued)

*Primary Examiner* — Kee M Tung
*Assistant Examiner* — Frank Chen
(74) *Attorney, Agent, or Firm* — Sughrue Mion, PLLC

(57) ABSTRACT

A method of transforming a 3D video format of a 3D video, the method including receiving a video sequence comprising 3D video that includes left-viewpoint video and right-viewpoint video; estimating at least one of disparity information between the left-viewpoint video and the right-viewpoint video and correlation information between neighboring pixel values of the left-viewpoint video and the right-viewpoint video, and determining a 3D video format of the 3D video based on a result of the estimating; transforming the left-viewpoint video and the right-viewpoint video into a format, based on the determined 3D video format; and displaying the transformed left-viewpoint video and the transformed right-viewpoint video three-dimensionally on a the display device.

29 Claims, 18 Drawing Sheets

(56) References Cited

OTHER PUBLICATIONS

Ianir Ideses et al., "Real-time 2D to 3D Video Conversion", Journal of Real-Time Image Processing, vol. 2, No. 1, pp. 3-9, 2007.

Olivier Faugeras et al., "Real time correlation-based stereo: algorithm, implementations and applications", Technical Report RR-2013, INRIA, 1993.

Luis Alvarez, "Dense Disparity Map Estimation Respecting Image Discontinuities: A PDE and Scale-Space Based Approach", Technical Report RR-3874, INRIA, 2000.

Communication dated Oct. 30, 2012 issued by the Mexican Patent Office in counterpart Mexican Patent Application No. MX/a/2011/012534.

Communication from the European Patent Office issued Mar. 12, 2013 in counterpart European Application No. 10792331.0.

* cited by examiner

| 3D VIDEO FORMAT | MANNER OF ARRANGEMENT |
|---|---|
| SIDE BY SIDE FORMAT |  |
| TOP AND BOTTOM FORMAT |  |
| HORIZONTAL LINE INTERLEAVED FORMAT |  |
| VERTICAL LINE INTERLEAVED FORMAT |  |
| FRAME/FIELD SEQUENTIAL FORMAT |  |
| CHECKER BOARD FORMAT |  |

FIG. 9
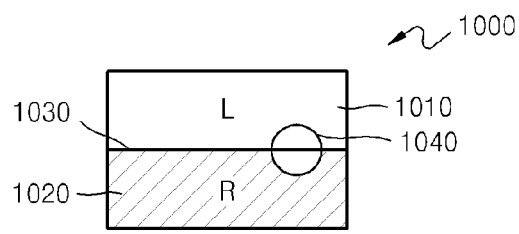
FIG. 10A
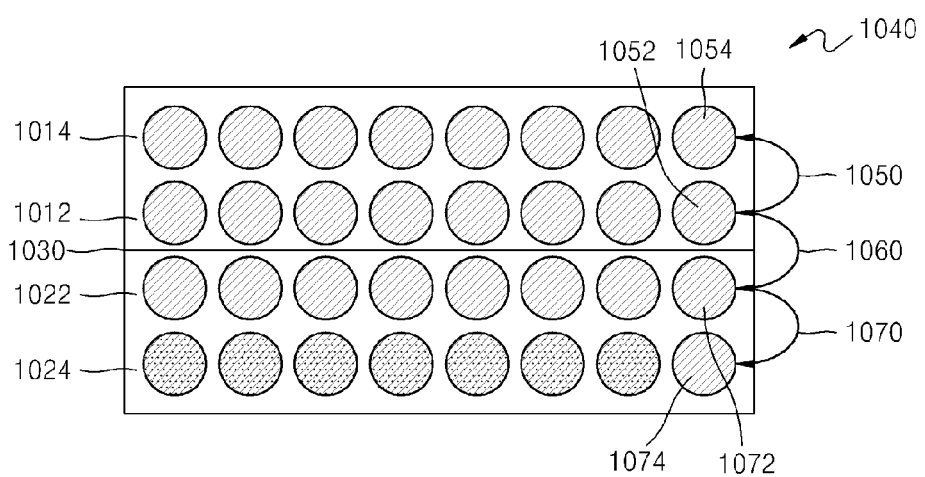
FIG. 10B

US 8,624,897 B2

METHOD AND APPARATUS FOR AUTOMATIC TRANSFORMATION OF THREE-DIMENSIONAL VIDEO

CROSS-REFERENCE TO RELATED PATENT APPLICATIONS

This application claims priority from U.S. Provisional Application No. 61/219,438 filed Jun. 23, 2009, and priority from Korean Patent Application No. 10-2009-0078841 filed Aug. 25, 2009, the disclosures of which are incorporated herein in their entirety by reference.

BACKGROUND

1. Field

Apparatuses and methods consistent with exemplary embodiments relate to video format transformation performed to reconstruct three-dimensional (3D) video that is a mixture of the left-viewpoint video and the right-viewpoint video.

2. Description of the Related Art

A plurality of pieces of two-dimensional (2D) video captured from various viewpoints is used to display 3D video. Various formats may be used to record the pieces of 2D video. Existing 3D display apparatuses alternately display a plurality of pieces of 2D video captured from different viewpoints to display 3D video. Thus, in order to accurately display the 3D video, the pieces of 2D video needs to be accurately extracted from the 3D video. To this end, correct information regarding the format of the 3D video is needed.

SUMMARY

Exemplary embodiments may address at least the above problems and/or disadvantages and other disadvantages not described above. Also, exemplary embodiments are not required to overcome the disadvantages described above, and an exemplary embodiment may not overcome any of the problems described above.

Exemplary embodiments provide a method of displaying video three-dimensionally by analyzing 3D video and determining the format of the 3D video, which represents a manner in which left-viewpoint video and right-view point video are arranged.

According to an aspect of an exemplary embodiment, there is provided a method of transforming a format of 3D video, the method including receiving a video sequence including 3D video that has left-viewpoint video and right-viewpoint video; estimating at least one of disparity information between the left-viewpoint video and the right-viewpoint video and correlation information between neighboring pixel values of the left-viewpoint video and the right-viewpoint video, and determining a 3D video format of the 3D video based on the result of estimation, where the 3D video format represents a manner in which the left-viewpoint video and the right-viewpoint video are arranged in the 3D video; transforming the left-viewpoint video and the right-viewpoint video into a format, based on the 3D video format, so that the left-viewpoint video and the right-viewpoint video are displayed three-dimensionally in a display device; and displaying the transformed left-viewpoint video and right-viewpoint video three-dimensionally in the display device.

The determining of the 3D video format may include determining whether the 3D video format is a side by side format, a top and bottom format, a horizontal line interleaved format, or a vertical line interleaved format, based on the disparity information between the left-viewpoint video and the right-viewpoint video.

The determining of the 3D video format may include determining whether the 3D video format is a horizontal line interleaved format, a vertical line interleaved format, or a checker board format, based on the correlation information between neighboring pixel values of the left-viewpoint video and the right-viewpoint video.

The determining of the 3D video format may include determining whether the 3D video format is a horizontal line interleaved format, a vertical line interleaved format, or a checker board format, based on the correlation information between neighboring pixel values of the left-viewpoint video and the right-viewpoint video; and determining whether the 3D video format is a field sequential format or a frame sequential format, based on the disparity information.

The determining of the 3D video format may include determining whether the 3D video format is the side by side format or the top and bottom format by detecting a boundary line between the left-viewpoint video and the right-viewpoint video.

In order to determine the 3D video format of the 3D video in a region that has texture of the 3D video, the determining of the 3D video format may further include detecting the region having texture by calculating a smoothness of corresponding regions of the left-viewpoint video and the right-viewpoint video.

The determining of the 3D video format may include estimating first disparity information by using an upper and lower differential image that represents an absolute value of a difference value between upper and lower regions of the 3D video (disparity estimated in consideration of the top and bottom format); and estimating second disparity information by using a left and right differential image that represents an absolute value of a difference value between left and right regions of the 3D video (disparity estimated in consideration of the side by side format).

The determining of the 3D video format may include determining whether the 3D video format is the top and bottom format or the side by side format, based on the first disparity information and the second disparity information.

The determining of the 3D video format may include dividing vertical lines in the 3D video into an odd-numbered vertical line and an even-numbered vertical line, and estimating third disparity information by using a vertical line differential image that represents an absolute value of a difference value between the odd-numbered vertical line and the even-numbered vertical line; and dividing horizontal lines in the 3D video into an odd-numbered line and an even-numbered horizontal line, and estimating fourth disparity information by using a horizontal line differential image that represents an absolute value of a difference value between the odd-numbered horizontal line and the even-numbered horizontal line.

The determining of the 3D video format may further include determining whether the 3D video format is the vertical line interleaved format or the horizontal line interleaved format, based on the third disparity information and the fourth disparity information.

The determining of the 3D video format may further include selecting the first section as a candidate section of the first disparity information when the length of a first section in which values of continuous pixels in the upper and lower differential image are greater than a first threshold is greater than a first longest disparity; and selecting the second section as a candidate section of the second disparity information when the length of a second section in which values of continuous pixels of the left and right differential image are greater than a second threshold is greater than a second longest disparity.

The determining of the 3D video format may further include comparing the total number of candidate sections of the first disparity information with the total number of candidate sections of the second disparity information, determining that the 3D video format is the top and bottom format when the total number of candidate sections of the first disparity information is less than the total number of candidate sections of the second disparity information, and determining that the 3D video format is the side by side format when the total number of candidate sections of the first disparity information is greater than the total number of candidate sections of the second disparity information.

The determining of the 3D video format may further include selecting the third section as a candidate section of the third disparity information when the length of a third section in which values of continuous pixels of the vertical line differential image are greater than a third threshold is greater than a third longest disparity; and selecting the fourth section as a candidate section of the fourth disparity information when the length of a fourth section in which values of continuous pixels of the horizontal line differential image are greater than a fourth threshold is greater than a fourth longest disparity.

The determining of the 3D video format may further include comparing the total number of candidate sections of the third disparity information with the total number of candidate sections of the fourth disparity information, determining that the 3D video format is the vertical line interleaved format when the total number of candidate sections of the third disparity information is greater than the total number of candidate sections of the fourth disparity information, and determining that the 3D video format is the horizontal line interleaved format when the total number of candidate sections of the third disparity information is less than the total number of candidate sections of the fourth disparity information.

The determining of the 3D video format may further include estimating correlation information between values of three pixels of the 3D video that are continuous in the vertical direction; and estimating correlation information between values of three pixels of the 3D video that are continuous in the horizontal direction.

The determining of the 3D video format may include determining the 3D video format to be the vertical line interleaved format when the total number of pieces of correlation information between values of pixels in the horizontal direction, which are greater than a threshold of correlation between pixel values, is greater than a predetermined threshold and when the total number of pieces of correlation information between values of pixels in the vertical direction, which are greater than the threshold of correlation between pixel values, is less than the predetermined threshold; determining the 3D video format to be the horizontal line interleaved format when the total number of pieces of correlation information between the values of pixels in the horizontal direction, which are greater than the threshold of correlation between pixel values, is less than a predetermined threshold and when the total number of pieces of correlation information between the values of pixels in the vertical direction, which are greater than the threshold of correlation between pixel values, is greater than the predetermined threshold; and determining the 3D video format to be the checker board format when both the total number of pieces of correlation information between the values of pixels in the horizontal direction, which are greater than the threshold of correlation between pixel values, and the total number of pieces of correlation information between the values of pixels in the vertical direction, which are greater than the threshold of correlation between pixel values, are greater than the predetermined threshold;

The correlation information between the values of three pixels that are continuous in the vertical direction may be a ratio of the sum of a second difference value and a third difference value to a first difference value, where the first difference value is an absolute value of a difference value between upper and lower pixels, the second difference value is an absolute value of a difference value between the upper pixel and a middle pixel, and the third difference value is an absolute value of a difference value between the middle and lower pixels from among the three pixels that are continuous in the vertical direction. The correlation information between the values of three pixels that are continuous in the horizontal direction may be a ratio of the sum of a fifth difference value and a sixth difference value to a fourth difference value, where the fourth difference value is an absolute value of a difference value between left and right pixels, the fifth difference value is an absolute value of a difference value between the left pixel and a center pixel, and the sixth difference value is an absolute value of a difference value between the center and right pixels from among the three pixels that are continuous in the horizontal direction.

The determining of the 3D video format may further include estimating a change in a temporal disparity between three continuous frames of the 3D video on a time axis.

The change in the temporal disparity between three continuous frames of the 3D video on the time axis may be a ratio of the sum of second differential frame data and third differential frame data to first differential frame data, where the first differential frame data is an absolute value of a difference value between first and third frames, the second differential frame data is an absolute value of a difference value between the first frame and a second frame, and the third differential frame data is an absolute value of a difference value between the second and third frames from among the three continuous frames on the time axis.

The detecting of the boundary line between the left-viewpoint video and the right-viewpoint video may include dividing the 3D video into two equal upper and lower regions, and calculating a ratio of a horizontal boundary line difference value to the sum of an upper horizontal boundary line difference value and a lower horizontal boundary line difference value, where the upper horizontal boundary line difference value is an absolute value of a difference value between two adjacent pixels that are disposed above and perpendicular to a horizontal boundary line between the upper and lower regions, the lower horizontal boundary difference value is an absolute value of a difference value between two adjacent pixels that are disposed below and perpendicular to the horizontal boundary line, and the horizontal boundary line difference value is an absolute value of a difference value between a pixel above and a pixel below the horizontal boundary line; and may include determining the 3D video to be the top and bottom format when the sum of ratios of horizontal boundary line difference values to the sums of upper horizontal boundary line difference values and lower horizontal boundary line difference values, is greater than a horizontal boundary line threshold.

The detecting of the boundary line between the left-viewpoint video and the right-viewpoint video may include dividing the 3D video into two equal left and right regions, and calculating a ratio of a vertical boundary line difference value to the sum of a left vertical boundary line difference value and a lower vertical boundary line difference value, where the left horizontal boundary line difference value is an absolute value of a difference value between two adjacent pixels that are disposed perpendicular to the left of a vertical boundary line between the left and right regions, the right horizontal boundary difference value is an absolute value of a difference value between two adjacent pixels that are disposed perpendicular to the right of the horizontal boundary line, and the horizontal boundary line difference value is an absolute value of a difference value between pixels that are disposed to the left and right of the vertical boundary line respectively; and may include determining the 3D video to be the side by side format when the sum of ratios of vertical boundary line difference values to the sums of left horizontal boundary line difference values and right horizontal boundary line difference values, is greater than a vertical boundary line threshold.

The detecting of the boundary line may include determining the 3D video format of the 3D video except for the boundary region when the 3D video has a boundary region that includes at least a predetermined number of black lines with respect to the boundary line.

If from among a plurality of frames of the 3D video, 3D video format of first frames is determined to be a first format, 3D video format of second frames is determined to be a second format, and 3D video formats of the remaining frames are determined to be the first format, then the determining of the 3D video format may include changing the 3D video format of the second frames from the second format to the first format, based on the total number of the predetermined number of frames, the 3D video formats of which are determined to be the second format.

The changing of the 3D video formats of the predetermined number of frames may include checking whether a predetermined number of further frames are determined to have the second format after the second frames are determined to have the second format; and changing the 3D video formats of the second frames to be the first format, and finally determining the remaining frames to have the second format.

The method may further include searching an Internet website for 3D video content by using the 3D video format as a keyword, where the receiving of the video sequence includes receiving 3D video content searched for in the web.

The searching of the web for 3D video content may include searching for video content that is a mixture of 2D video and the 3D video. The receiving of the video sequence may include receiving video content searched for in the web. The transforming of the left-viewpoint video and the right-viewpoint video of the 3D video into a format may include transforming the left-viewpoint video and the right-viewpoint video into a format so that they are reproduced three-dimensionally, based on the 3D video format that is the keyword. The method may further include reproducing the 2D video of the video sequence two-dimensionally, and reproducing the 3D video three-dimensionally in the format into which the 3D video was transformed.

Location information of the 3D video may be transmitted from a provider of the 3D video content to a web browser. The web browser may estimate at least one of disparity information and correlation information between neighboring pixel values, determine a 3D video format of the 3D video, transforms the 3D video in a format so that the 3D video is reproduced three-dimensionally, and then reproduce the 3D video three-dimensionally.

The method may further include detecting location of the 3D video in the 3D video content, wherein the detecting is performed by a 3D display device. The 3D display device may reproduce the transformed 3D video three-dimensionally at the location of the 3D video.

According to an aspect of another exemplary embodiment, there is provided an apparatus for transforming a format of 3D video, the apparatus including a video input unit receiving a video sequence including 3D video that has left-viewpoint video and right-viewpoint video; a format determination unit estimating at least one of disparity information between the left-viewpoint video and the right-viewpoint video and correlation information between neighboring pixel values of the left-viewpoint video and the right-viewpoint video, and determining a 3D video format of the 3D video based on the result of estimation, where the 3D video format represents a manner in which the left-viewpoint video and the right-viewpoint video are arranged in the 3D video; a format transform unit transforming the left-viewpoint video and the right-viewpoint video into a format, based on the 3D video format, so that the left-viewpoint video and the right-viewpoint video are displayed three-dimensionally in a display device; and a display unit displaying the transformed left-viewpoint video and right-viewpoint video three-dimensionally in the display device.

According to an aspect of another exemplary embodiment, there is provided a non-transitory computer-readable recording medium having recorded thereon a computer program for executing the method of transforming a format of 3D video.

BRIEF DESCRIPTION OF THE DRAWINGS

The above and other aspects will become more apparent by describing in certain exemplary embodiments thereof with reference to the accompanying drawings, in which:

FIG. 9 is a table showing results of determining a 3D video format based on correlation information between neighboring pixels, according to an exemplary embodiment;

FIG. 10A illustrates 3D video having a top and bottom format, according to an exemplary embodiment;

FIG. 10B illustrates a part of a boundary line between an upper region and a lower region of the 3D video of FIG. 10A in more detail, according to an exemplary embodiment;

DETAILED DESCRIPTION

Figure 1:
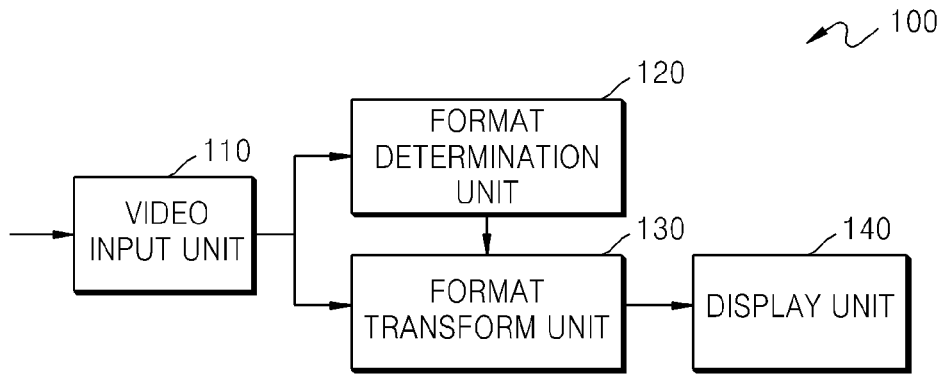
FIG. 1 is a block diagram of a 3D video format transforming apparatus, according to an exemplary embodiment.

Certain exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters.

Hereinafter, various exemplary embodiments for transforming the format of 3D video will be described in detail with reference to FIGS. 1 through 19.

FIG. 1 is a block diagram of a 3D video format transforming apparatus 100, according to an exemplary embodiment. Referring to FIG. 1, the 3D video format transforming apparatus 100 includes a video input unit 110, a format determination unit 120, a format transform unit 130, and a display unit 140.

A sequence of video input via the video input unit 110 includes 3D video containing left-viewpoint video and right-viewpoint video. The input video may be 2D video, 3D video, or mixed video of 2D video and 3D video. In the mixed video, 2D video sections and 3D video sections may be mixed according to time or space.

For example, the left-viewpoint video and the right-viewpoint video may be arranged in one frame of 3D video so that the 3D video frame can include information regarding the left-viewpoint video and the right-viewpoint video. Alternatively, a 3D video sequence may be generated by alternately repeating a left-viewpoint video frame and a right-viewpoint video frame or by alternately repeating a left-viewpoint video field and a right-viewpoint video field. Hereinafter, a manner in which the left-viewpoint video and the right-viewpoint video are arranged in the 3D video will be referred to as a "3D video format".

The format determination unit 120 analyzes the 3D video contained in the input video and determines the 3D video format. The format determination unit 120 analyzes the 3D video, and estimates at least one of disparity information regarding the 3D video or correlation information between the values of neighboring pixels of the 3D video. The format determination unit 120 determines the 3D video format based on the estimated disparity information and/or the estimated correlation information. If the input video is 2D video, the 3D video format is not determined.

According to an exemplary embodiment, the format determination unit 120 may determine whether the 3D video format is a side by side format, a top and bottom format, a horizontal line interleaved format, a vertical line interleaved format, or a checker board format, based on either the disparity information between the left-viewpoint video and the right-viewpoint video contained in the 3D video or the correlation information. Alternatively, the format determination unit 120 may determine whether the 3D video format is a field sequential format or a frame sequential format, based on the disparity information regarding each field or frame of the 3D video. The format determination unit 120 may estimate the disparity information and the correlation information in a parallel manner to determine the 3D video format. Alternatively, the format determination unit 120 may estimate only the disparity information or the correlation information to determine the 3D video format.

For example, the format determination unit 120 may determine whether the 3D video format is the side by side format, the top and bottom format, the horizontal line interleaved format, or the vertical line interleaved format, based on the disparity information regarding the left-viewpoint video and the right-viewpoint video. Also, the format determination unit 120 may determine whether the 3D video format is the horizontal line interleaved format, the vertical line interleaved format, or the checker board format by using the correlation information between the values of the neighboring pixels of the left-viewpoint video and the right-viewpoint video.

The format determination unit 120 may detect and use a boundary line between the left-viewpoint video and the right-viewpoint video to improve the performance for determining whether the 3D video format is the side by side format or the top and bottom format.

The disparity information or the correlation information may not be correctly estimated in a flat and spacious image region having no texture. Thus, the format determination unit 120 may calculate the smoothness of corresponding regions of the left-viewpoint video and the right-viewpoint video and detect a region of the 3D video having texture, the 3D video format of which is to be determined.

The format determination unit 120 may estimate the disparity information by estimating information related to a disparity between upper and lower regions of the 3D video from a difference value between the upper and lower regions and by estimating information related to a disparity between left and right regions of the 3D video based on an absolute value of the difference between the left and right regions.

The format determination unit 120 may determine whether the 3D video format is the top and bottom format or the side by side format, based on the estimated information related to the disparity between the upper and lower regions or between the left and right regions.

Alternatively, the format determination unit 120 may estimate the disparity information by estimating information related to a disparity between vertical lines of the 3D video from a vertical line differential image that represents an absolute value of the difference between an odd-numbered vertical line and an even-numbered vertical line of the 3D video and by estimating information related to a disparity between horizontal lines of the 3D video from a horizontal line differential image that represents an absolute value of the difference between an odd-numbered horizontal line and an even-numbered horizontal line of the 3D video.

The format determination unit 120 may determine whether the 3D video format is the horizontal line interleaved format or the vertical line interleaved format, based on the estimated information regarding a disparity between the horizontal lines, and the information related to a disparity between the vertical lines.

The information related to a disparity between the upper and lower regions, the information related to a disparity between the left and right regions, the information related to a disparity between vertical lines and the information related to a disparity between horizontal lines, may include an estimated disparity, a maximum threshold of a disparity section, the total number of candidate disparity sections, etc.

The format determination unit 120 may estimate the correlation information by estimating the correlation information between the vertical pixel values of first, second, and third pixels of the 3D video, which are consecutive in the vertical direction, and by estimating correlation information between horizontal pixel values of three (first, second, and third) pixels of the 3D video, which are consecutive in the horizontal direction. The format determination unit 120 may determine whether the 3D video format is the vertical line interleaved format, the horizontal line interleaved format, or the checker board format by comparing the correlation information between the vertical pixel values with a correlation threshold between the vertical pixel values and comparing the correlation information between the horizontal pixel values with a correlation threshold between the horizontal pixel values.

If an absolute value of the difference between the first and third pixels of three consecutive pixels is a first difference value, an absolute value of the difference between the first and second pixel values is a second difference value, and an absolute value of the difference between the second and third pixel values is a third difference value, then the correlation information between the vertical pixel values or the horizontal pixel values may be a ratio of the sum of the second and third difference values and the first difference value.

The format determination unit 120 may estimate a variation of a temporal disparity by using a first differential frame that represents an absolute value of the difference between first and third frames of three frames that are consecutive on the time axis, a second differential frame that represents an absolute value of the difference between the first and second frames, and a third differential frame that represents an absolute value of the difference between the second and third frames. In this case, the disparity information between the first, second, and third frames is a ratio of the sum of data of the second and third differential frames and data of the first differential frame.

The format determination unit 120 may determine whether 3D video format is the frame sequential format according to the estimated variation of the temporal disparity. Similarly, it is possible to determine whether the 3D video format is the field sequential format.

The format determination unit 120 may determine whether the 3D video format is the top and bottom format by using a ratio of difference values between adjacent pixels perpendicular to a horizontal boundary line between the upper and lower regions of the 3D video.

Also, the format determination unit 120 may determine whether the 3D video format is the side by side format by using a ratio of difference values between adjacent pixels perpendicular to a vertical boundary line between the left and right regions of the 3D video. In this case, the correlation between the values of adjacent pixels of a region that is estimated in an image region other than the region around the vertical boundary line may be used.

If the format determination unit 120 determines that a first group of consecutive frames has a first format, a second group pf predetermined number of subsequent frames has a second format, and a third group of other remaining subsequent frames after the second group have the first format, then the format determination unit 120 may finally determine all of the frames to have the first format, thereby preventing a sudden change in the 3D video format from causing an error or from degrading a stereoscopic effect.

If the format determination unit 120 determines that a first group of frames has a first format, a number of frames of the second group greater than a predetermined number has a second format, and the frames of the third group also have the second format, the format determination unit 120 may finally determine the frames of the first and second groups to have the first format and the frames of the third group to have the second format.

That is, if determination results of the first and second groups are switched from the first format to the second format and then at least a predetermined number of frames of the third group keeps having the second format, the format determination unit 120 may finally determine the frames of the third group to have the second format based on observation of 3D video format of the second group.

The format transform unit 130 separates the left-viewpoint video and the right-viewpoint video which are 2D video from the 3D video, and transforms the formats of the left-viewpoint video and the right-viewpoint video so that they can be reconstructed three-dimensionally by the display unit 140.

For example, if the 3D video has the frame sequential format or the field sequential format, the format transform unit 130 transmits the left-viewpoint video and the right-viewpoint video to the display unit 140 without restoring the resolutions thereof so that the left-viewpoint video and the right-viewpoint video can be synchronized with each other.

If the 3D video has the side by side format, the top and bottom format, the vertical line interleaved format, the horizontal line interleaved format, or the checker board format, then the left-viewpoint video and the right-viewpoint video are recorded in one frame in a resolution that is a half full resolution. When the left-viewpoint video and the right-viewpoint video contained in the 3D video are not recorded in a full resolution, the format transform unit 130 may separate the left-viewpoint video and the right-viewpoint video from the 3D video and interpolate them so that they can be restored to the full resolution.

If the input video is the 2D video, the format transform unit 130 does not need to perform such a resolution restoration process.

The display unit 140 reconstructs a 3D video from the left-viewpoint video and the right-viewpoint video, the formats of which have been transformed.

According to an exemplary embodiment, the 3D video format transforming apparatus 100 may obtain 3D video content from an Internet website. When a 3D video format is searched for by using a web browser, it is possible to detect 3D video content in the 3D video format, which is shared through a website. According to an exemplary embodiment, the 3D video format transforming apparatus 100 may be connected to the web, and may thus receive the 3D video content detected on the web and transform the 3D format of the 3D video content by using the format transform unit 130 so that the 3D video content may be displayed three dimensionally. If the 3D video format of the 3D video content is not known, the 3D video format may be determined using the format determination unit 120.

According to an exemplary embodiment, the 3D video format transforming apparatus 100 may display the 3D video content, which is obtained from an Internet website, on a web browser. When the 2D video content and 3D video content are displayed in a web page window on the web browser, the 3D video format transforming apparatus 100 may display the 2D video content two dimensionally and display the 3D video content three dimensionally.

The 3D video format transforming apparatus 100 may detect the location of 3D video content directly on a web page or may receive information regarding the location of the 3D video content from a web page provider.

The 3D video format transforming apparatus 100 may provide a web browser with the information regarding 3D video format determined with respect to the 3D video content so that the 3D video content can be displayed three dimensionally in a window of the web browser.

In an exemplary embodiment, the 3D video format transforming apparatus 100 may analyze 3D video and estimate the 3D video format thereof without having to obtain any additional information regarding the 3D video format. Accordingly, no additional storage space or transport channel is needed to transmit information regarding the 3D video format.

Figure 2:
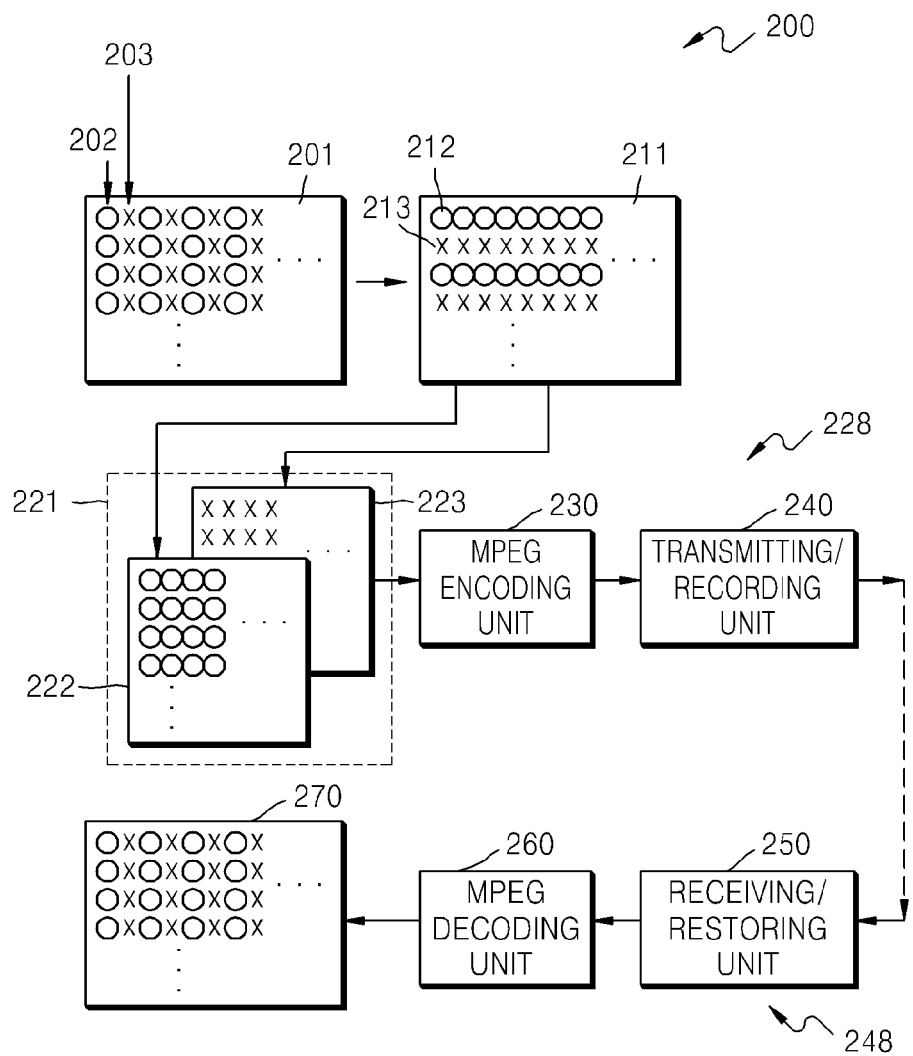
FIG. 2 is a block diagram of a system that encodes/decodes 3D video, according to an exemplary embodiment.

FIG. 2 is a block diagram of a system 200 that encodes/decodes 3D video according to an exemplary embodiment. The system 200 includes a transmitting terminal 228 having a Moving Picture Expert Group (MPEG) encoding unit 230 and a transmitting/recording unit 240, and a receiving terminal 248 having a receiving/restoring unit 250 and an MPEG decoding unit 260.

In a vertical line interleaved format 201, pixels in odd-numbered vertical lines 202 are data of the left-viewpoint video and pixels in even-numbered vertical lines 203 are data of the right-viewpoint video. In a horizontal line interleaved format 211, the left-viewpoint video data and the right-viewpoint video data are alternately and repeatedly arranged in odd-numbered horizontal lines 212 and even-numbered horizontal lines 213, respectively. In a field sequential format 221, an odd-numbered field 222 and an even-numbered field 223 are stored as a left-viewpoint video field and a right-viewpoint video field, respectively.

When the 3D video of the various 3D video formats 201, 211, and 221 is input to the MPEG encoding unit 230, the 3D video is compressed and encoded according to an MPEG encoding/decoding method, and is either transmitted from the transmitting terminal 228 to the receiving terminal 248 via a network or is recorded on a recording medium (not shown) by the transmitting/recording unit 240. In the receiving terminal 248, the receiving/restoring unit 250 receives the encoded 3D video and the MPEG decoding unit 260 decodes it to produce the 3D video 270 according to the MPEG encoding/decoding method.

A 3D video format of the 3D video 270 corresponds to the 3D video formats 201, 211, and 221 of the input 3D video received from the transmitting terminal 228.

Figure 3:
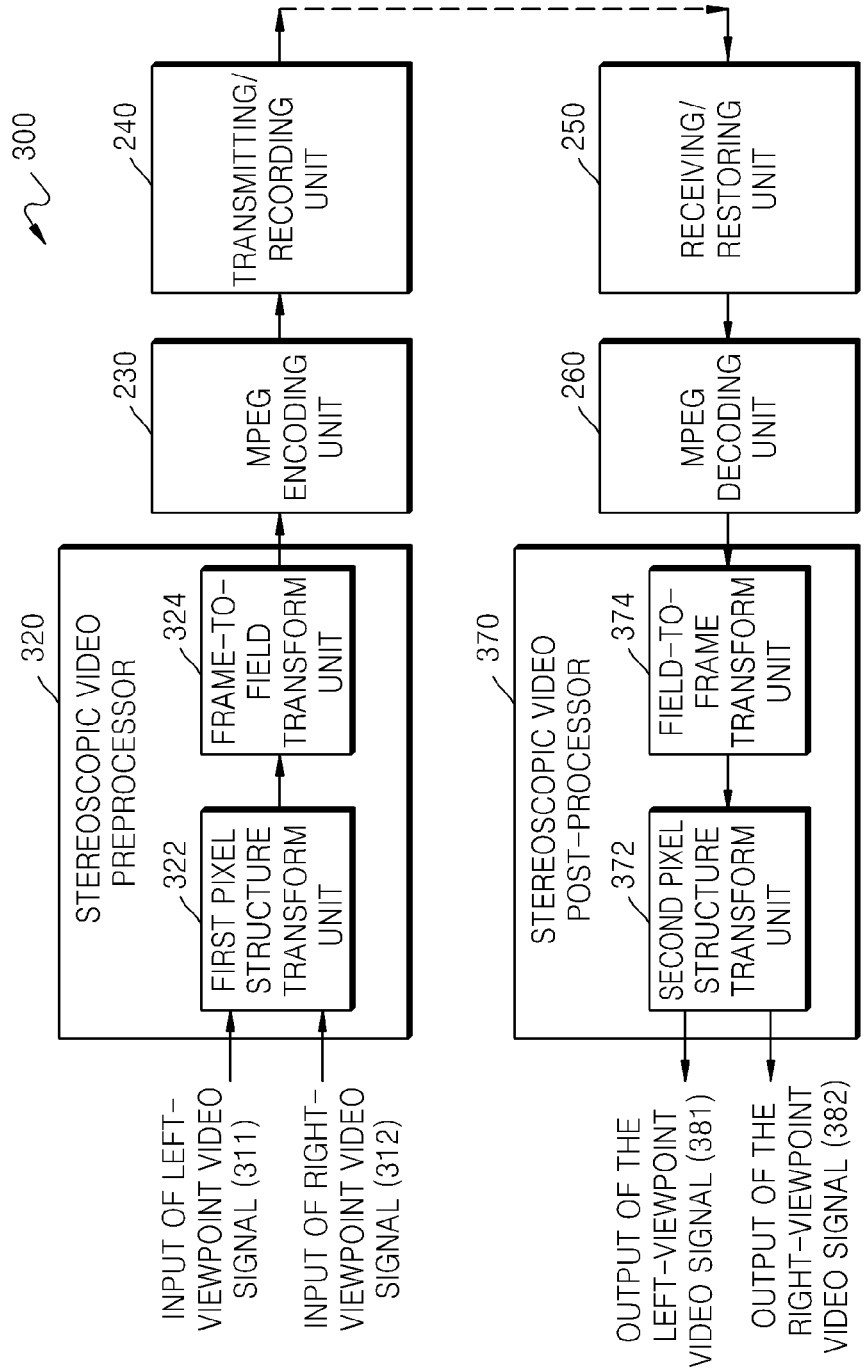
FIG. 3 is a block diagram of a system that generates and encodes/decodes 3D video, according to an exemplary embodiment.

FIG. 3 is a block diagram of a system 300 that generates and encodes/decodes the 3D video, according to an exemplary embodiment. The system 300 includes a transmitting terminal having a stereoscopic video preprocessor 320, an MPEG encoding unit 230, a transmitting/recording unit 240, and a receiving terminal having a receiving/restoring unit 250, an MPEG decoding unit 260, and a stereoscopic video post-processor 370. The stereoscopic video preprocessor 320 includes a first pixel structure transform unit 322 and a frame-to-field transform unit 324, and the stereoscopic video post-processor 370 includes a field-to-frame transform unit 374 and a second pixel structure transform unit 372.

The 3D video is a mixture of the left-viewpoint video and right-viewpoint video. Thus, when a left-viewpoint video signal 311 and a right-viewpoint video signal 312 are individually input to the stereoscopic video preprocessor 320, the stereoscopic video preprocessor 320 generates a 3D video format by using the first pixel structure transform unit 322 and the frame-to-field transform unit 324 such that the left-viewpoint video and the right-viewpoint video are mixed in units of pixels within one frame or are mixed in units of frames or fields.

The 3D video in the 3D video format generated by the stereoscopic video preprocessor 320 is compressed and encoded by the MPEG encoding unit 230 and is transmitted from the transmitting terminal to the receiving terminal or is recorded on a recording medium (not shown) by the transmitting/recording unit 240.

In the receiving terminal, the receiving/restoring unit 250 receives the encoded 3D video and the MPEG decoding unit 260 decodes it according to an MPEG encoding/decoding method to reconstruct the 3D video. The stereoscopic video post-processor 370 separates the left-viewpoint video and the right-viewpoint video from the 3D video by using the field-to-frame transform unit 374 and the second pixel structure transform unit 372. Then, the left-viewpoint video and the right-viewpoint video are transformed into a left-viewpoint video signal 381 and a right-viewpoint video signal 382 to be displayed three dimensionally on a display device (not shown).

Figure 4:
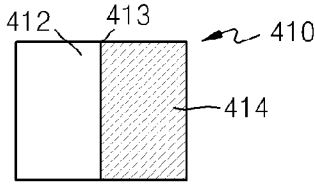
FIG. 4 illustrates various 3D video formats of 3D video, according to an exemplary embodiment.
Figure 4:
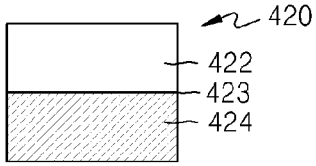
Figure 4:
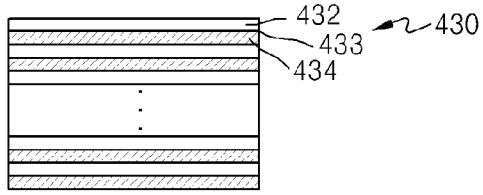
Figure 4:
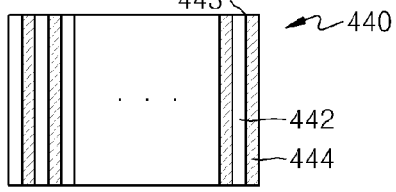
Figure 4:
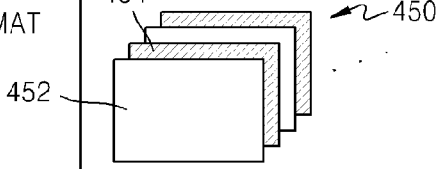
Figure 4:
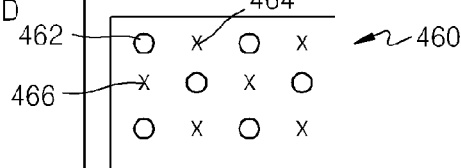

FIG. 4 illustrates various 3D video formats of 3D video, according to an exemplary embodiment. The 3D video can be displayed three dimensionally if a 3D video encoding/decoding system 200, 300 appropriately separates the left-viewpoint video and right-viewpoint video from the 3D video. A 3D video format of the 3D video represents a manner in which the left-viewpoint video and right-viewpoint video are arranged in the 3D video.

Examples of the 3D video formats include the side by side format, the top and bottom format, the horizontal line interleaved format, the vertical line interleaved format, a frame/field sequential format, and the checker board format.

In the side by side format, the left-viewpoint video and the right-viewpoint video, which correspond to a left region 412 and a right region 414 of a 3D video frame 410, respectively, are arranged in parallel horizontally. The order in which the left-viewpoint video and the right-viewpoint video are arranged may vary according to an initial setting to correspond to the left and right regions 412 and 414 or the right and left regions 414 and 412, respectively. Thus, the correlation between the left and right regions 412 and 414 is high, and a high-frequency discontinuous line is present at a vertical boundary line 413 between the left and right regions 412 and 414.

In the side by side format, the capacity of memory needed to drive a system is small and existing recording media may be reused as a memory.

In the top and bottom format, the left-viewpoint video and the right-viewpoint video, which correspond to an upper region 422 and a lower region 424 of a 3D video frame 420, respectively, are arranged in parallel vertically. The order in which the left-viewpoint video and the right-viewpoint video are arranged may vary according to an initial setting to correspond to the upper and lower regions 422 and 424 or the lower and upper regions 424 and 422, respectively. Thus, the correlation between the upper and lower regions 422 and 424 is high, and a high-frequency discontinuous line is present at a horizontal boundary line 423 between the upper and lower regions 422 and 424.

The top and bottom format allows existing recording media to be reused.

In the horizontal line interleaved format, the left-viewpoint video and the right-viewpoint video, which correspond to odd-numbered horizontal lines 432 and even-numbered horizontal lines 434 of a 3D video frame 430, respectively, are arranged in parallel horizontally. The order in which the left-viewpoint video and the right-viewpoint video are arranged may vary according to an initial setting to correspond to the odd-numbered horizontal lines 432 and the even-numbered horizontal lines 434 or the even-numbered horizontal lines 434 and the odd-numbered horizontal lines 432, respectively. Thus, a high-frequency component is generated between adjacent horizontal lines in a region 433 where a disparity between the left-viewpoint video and the right-viewpoint video is large.

The horizontal line interleaved format is a 3D video format optimized for interlaced scanning type stereoscopic display.

In the vertical line interleaved format, the left-viewpoint video and the right-viewpoint video, which correspond to odd-numbered vertical lines 442 and even-numbered vertical lines 444 of a 3D video frame 440, respectively, are arranged in parallel vertically. The order in which the left-viewpoint video and the right-viewpoint video are arranged may vary according to an initial setting to correspond to the odd-numbered vertical lines 442 and the even-numbered vertical lines 444 or the even-numbered vertical lines 444 and the even-numbered vertical lines 442, respectively. Thus, a high-frequency component is generated between adjacent vertical lines in a region 443 in which a disparity between the left-viewpoint video and the right-viewpoint video is large.

The vertical line interleaved format is a 3D video format optimized for a parallel barrier type stereoscopic display.

In the frame/field sequential format, the left-viewpoint video and the right-viewpoint video, which correspond to odd-numbered frames/fields 452 and even-numbered frames/fields 454 of a 3D video frame/field sequence 450, respectively, are arranged in parallel. The order in which the left-viewpoint video and the right-viewpoint video are arranged may vary according to an initial setting to correspond to the odd-numbered frames/fields 452 and the even-numbered frames/fields 454 or the even-numbered frames/fields 454 and the odd-numbered frames/fields 452, respectively. Accordingly, in the frame/field sequential format, pixel values and a motion vector vary repeatedly in units of the frames or fields.

In the frame sequential format, the resolution of 3D video can be maintained to be the same as that of a 2D video sequence.

In the checker board format, the left-viewpoint video and the right-viewpoint video, which correspond to horizontal pixels 462 and 464 and vertical pixels 462 and 466, respectively, are alternately arranged in units of pixels of a 3D video frame 460. The order in which the left-viewpoint video and right-viewpoint video are arranged may vary according to an initial setting to correspond to horizontal/vertical first and second pixels or horizontal/vertical second and first pixels, respectively. Thus, in the checker board format, a high-frequency component is generated in an omni-direction.

When interpolation is performed on the checker board format, the result of interpolation may be excellent.

Figure 5:
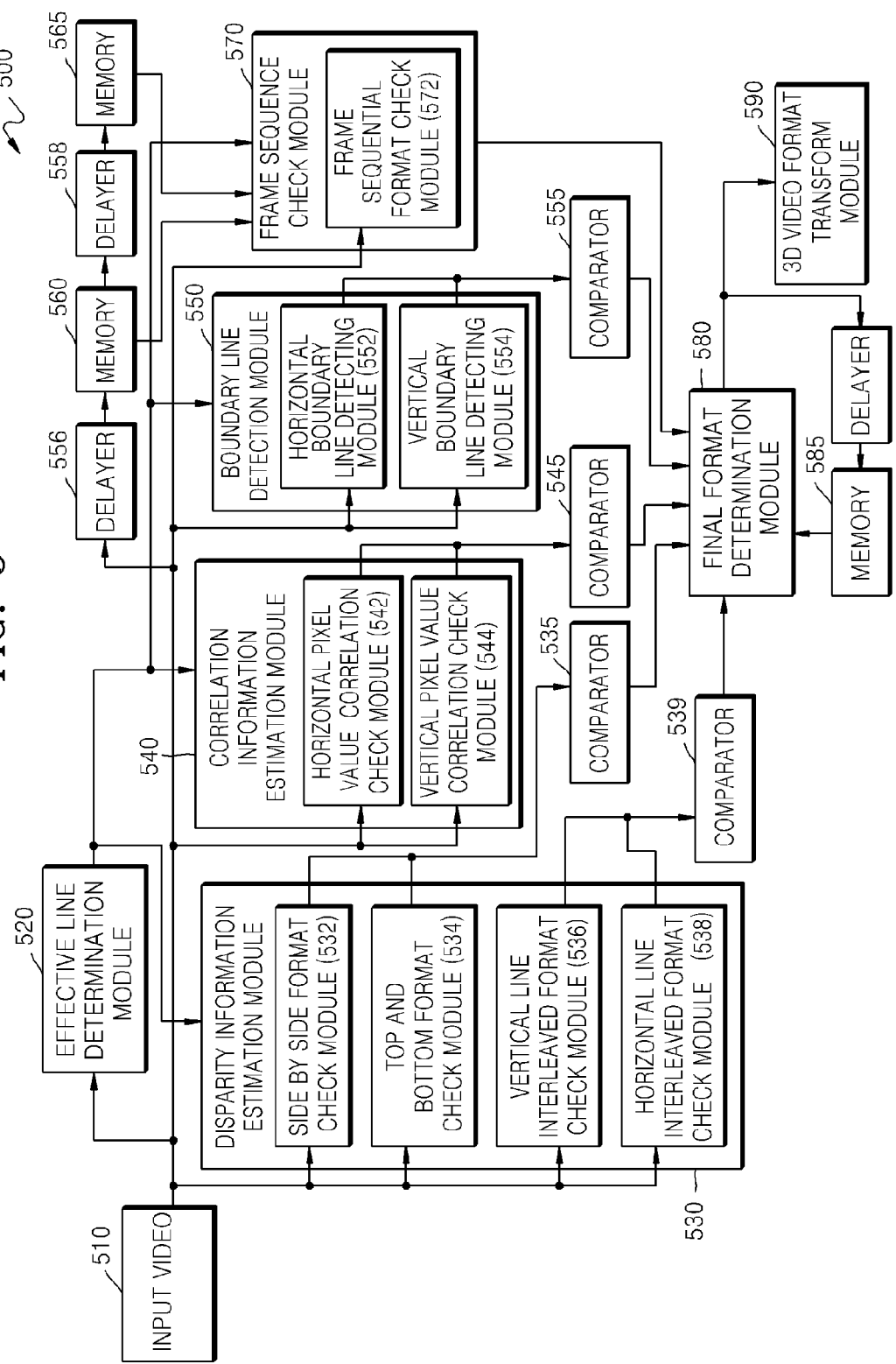
FIG. 5 is a block diagram illustrating in detail the construction of a format determination unit included in the 3D video format transforming apparatus of FIG. 1, according to an exemplary embodiment.

FIG. 5 is a block diagram illustrating in detail the construction of the format determination unit 120 of the 3D video format transforming apparatus 100 of FIG. 1, according to an exemplary embodiment. According to an exemplary embodiment, the format determination unit 120 may perform a multi-step process to determine a 3D video format of an input video 510. The block diagram 500 illustrates a case where both disparity information and correlation information between the values of adjacent pixels are used to determine whether the 3D video format is the side by side format, the top and bottom format, the vertical line interleaved format, the horizontal line interleaved format, the checker board format, or the frame sequential format.

In the block diagram of FIG. 5, a disparity information estimation module 530 includes a side by side format check module 532 that estimates and uses information regarding a disparity between the left and right regions of the 3D video; a top and bottom format check module 534 that estimates and uses information regarding a disparity between the upper and lower regions of the 3D video; a vertical line interleaved format check module 536 that estimates and uses disparity information regarding a vertical line; and a horizontal line interleaved format check module 538 that estimates and uses disparity information regarding a horizontal line.

A correlation information estimation module 540 includes a horizontal pixel value correlation check module 542 that estimates and uses correlation information between neighboring pixels in the horizontal direction, and a vertical pixel value correlation check module 544 that estimates and uses correlation information between neighboring pixels in the vertical direction.

A boundary line detection module 550 detects a boundary line and includes a horizontal boundary line detecting module 552 and a vertical boundary line detecting module 554.

A frame sequence check module 570 includes a frame sequential format check module 572 that estimates and uses a variation in a temporal disparity between the frames. For an arithmetic operation of the frame sequence check module 570, three or more consecutive frames are used, and thus, frames are input via two or more delayers 556 and 558 and two or more memories 560 and 565.

The disparity information and the correlation information may be used more effectively when the pixel values of the left-viewpoint video are different from the corresponding pixel values of the right-viewpoint video. For this reason, the performance of determining a 3D video format by using the disparity information or the correlation information may be reduced in a flat and spacious region. Thus, an effective line determination module 520 determines an effective line, the disparity information or the correlation information of which is to be calculated, based on the smoothness between the left-viewpoint video and the right-viewpoint video. A smoothness of a region may be calculated by using an amount of dispersion of the values of pixels of the region or by using various types of filters, such as a sobel operator.

The effective line determination module 520 may provide information regarding the effective line to the disparity information estimation module 530, the correlation information estimation module 540, the boundary line detection module 550 and the frame sequence check module 570, so that a 3D video format of the effective line can be determined.

A plurality of comparators 535, 539, 545 and 555 compares results of checking the 3D video format with one another, and the result of checking, which shows the highest probability, is supplied to a final format determination module 580. That is, the results of checking the 3D video format by estimating disparity information by the side by side format check module 532 and the top and bottom format check module 534 of the disparity information estimation module 530 are compared with each other by a comparator 535, and the result of checking, which shows the highest probability, is supplied to the final format determination module 580. The results of checking the 3D video format by estimating disparity information by the vertical line interleaved format check module 536 and the horizontal line interleaved format check module 538 of the disparity information estimation module 530 are compared with each other by a comparator 539, and the result of checking, which shows the highest probability, is supplied to the final format determination module 580.

Also, the results of checking the 3D video format by estimating correlation information between neighboring pixels by the horizontal pixel value correlation check module 542 and the vertical pixel value correlation check module 544 of the correlation information estimation module 540 are compared with each other by a comparator 545, and the result of checking, which shows the highest probability, is supplied to the final format determination module 580. The results of checking the 3D video format by detecting a boundary line by the horizontal boundary line detection module 552 and the vertical boundary line detection module 554 of the boundary line detection module 550 are compared with each other by a comparator 555, and the result of checking, which shows the highest probability, is supplied to the final format determination module 580.

Also, the result of checking the 3D video format by the frame sequential format check module 572 of the frame sequence check module 570 is supplied to the final format determination module 580.

The final format determination module 580 collects the result of checking whether the 3D video format is the side by side format or the top and bottom format, the result of checking whether the 3D video format is the vertical line interleaved format or the horizontal line interleaved format, the result of checking the correlation between horizontal pixel values and the correlation between vertical pixel values, the result of detecting a horizontal boundary line and a vertical boundary line, and the result of checking whether the 3D video format is the frame sequential format; compares the results with one another; and then finally determines the 3D video format. Information regarding the determined 3D video format is supplied to a 3D video format transform module 590, and the 3D video is transformed into the formats such that the 3D video is displayed three-dimensionally on a display device (not shown).

Also, when an error in information regarding the 3D video format, which was determined with respect to previous frames and is stored in a memory 585 via a delayer 592, is observed, the information regarding the 3D video format may be more accurately determined by correcting this error.

In the block diagram of FIG. 5, a 3D video format is determined in consideration of the disparity information, correlation information between neighboring pixel values, boundary lines, and the result of checking a frame sequence. However, in the 3D video format transforming apparatus 100 according to an exemplary embodiment, a 3D video format may be determined by using at least one piece of information selected from the group consisting of disparity information, correlation information between neighboring pixel values, boundary lines, and the result of checking a frame sequence based on a system design or a user setting.

A method of determining a 3D video format based on the disparity information or the correlation information between neighboring pixel values will now be described in detail with reference to FIGS. 6A to 14. In detail, a method of estimating the disparity information, a method of checking whether a 3D video format is the side by side format or the top and bottom format, based on the disparity information, and a method of checking whether a 3D video format is the vertical line interleaved format or the horizontal line interleaved format based on the disparity information will be described in detail with reference to FIGS. 6A, 6B, 6C, 6D, 7A and 7B. A method of estimating correlation information between neighboring pixels, a method of comparing the correlation between horizontal pixel values with the correlation between vertical pixel values, and a method of checking whether a 3D video format is the vertical line interleaved format, the horizontal line interleaved format, or the checker board format will be described in detail with reference to FIGS. 8A, 8B, and 9.

Also, a method of detecting a boundary line, and a method of checking whether a 3D video format is the side by side format or the top and bottom format, based on the boundary line will be described in detail with reference to FIGS. 10A, 10B, 11A, 11B, 12A, and 12B. A method of checking whether a 3D video format is the frame sequential format will be described in detail with reference to FIGS. 13A, 13B, and 14.

Figure 6A:
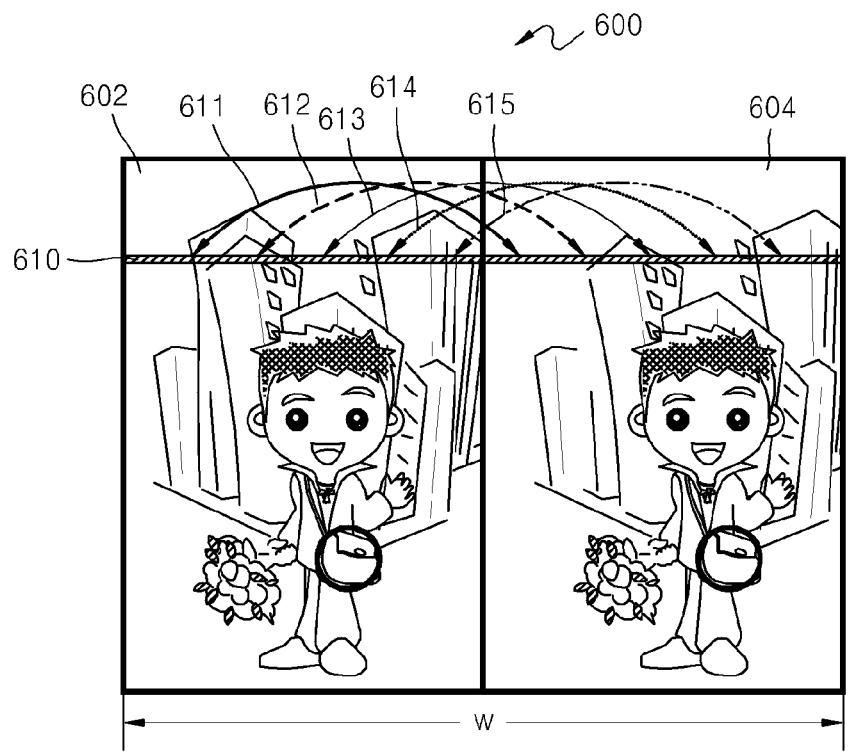
FIG. 6A is a diagram illustrating a method of estimating disparity information between left and right regions of 3D video, according to an exemplary embodiment.

FIG. 6A is a diagram illustrating a method of estimating the disparity information between the left and right regions of the 3D video, according to an exemplary embodiment.

The format determination unit 120 of FIG. 1 divides the 3D video frame into a left region and a right region, calculates the difference between the values of pixels of the left and right regions, and checks whether the difference corresponds to a disparity generated in the 3D video in the side by side format to determine whether a 3D video format of input video is the side by side format.

Referring to FIG. 6A, if a 3D video frame 600 has the side by side format, a left region 602 and a right region 604 corresponds to the left-viewpoint video and right-viewpoint video, respectively. The left-viewpoint video and the right-viewpoint video contain video information of the same subject but they are slightly different from each other at the same location according to a viewpoint. Thus, a disparity of at least a predetermined amount may occur between pixels that correspond to the left-viewpoint video and the right-viewpoint video, respectively.

A plurality of combinations 611, 612, 613, 614 and 615, between the left-viewpoint video pixels and the right-viewpoint video pixels that correspond to one another on a predetermined horizontal line 610 is present in the 3D video frame 600. A disparity of at least a predetermined amount may occur in each of the combinations 611, 612, 613, 614, and 615.

A difference value between the left region 602 and the right region 604 of the 3D video frame 600 is calculated as follows:

$$I_{diff}(i,j)=|I(i,j)-I(i,j+w/2)| \quad (1),$$

where (i,j) denotes the index of pixel location, I(i,j) denotes a pixel value of the 3D video frame 600, w denotes the entire width of the 3D video frame 600, and $I_{diff}(i,j)$ denotes a pixel value of an absolute differential image of the left and right regions 602 and 604 of the 3D video frame 600. A disparity between the corresponding left-viewpoint video pixel and right-viewpoint video pixel may be estimated from the absolute differential image of the left and right regions 602 and 604.

The format determination unit 120 calculates an absolute value of the difference between the values of pairs of the corresponding pixels of a left region and a right region at the same horizontal line of the input video. If the total number of pairs of the corresponding consecutive pixels having at least a predetermined absolute value is equal to or greater than a predetermined number, then a section in which the pairs of the corresponding consecutive pixels are present may be estimated to be a disparity section in which a disparity occurs.

When a disparity section in 3D video, the format of which is not the side by side format, is estimated as described above, information of a left region of the 3D video is substantially different from that of a right region thereof, and thus, a disparity between the left and right regions is great. If information of a disparity section is less than a threshold, the 3D video format may be determined to be the side by side format, and if this information is equal to or greater than the threshold, the 3D video format may be determined not to be the side by side format.

Figure 6B:
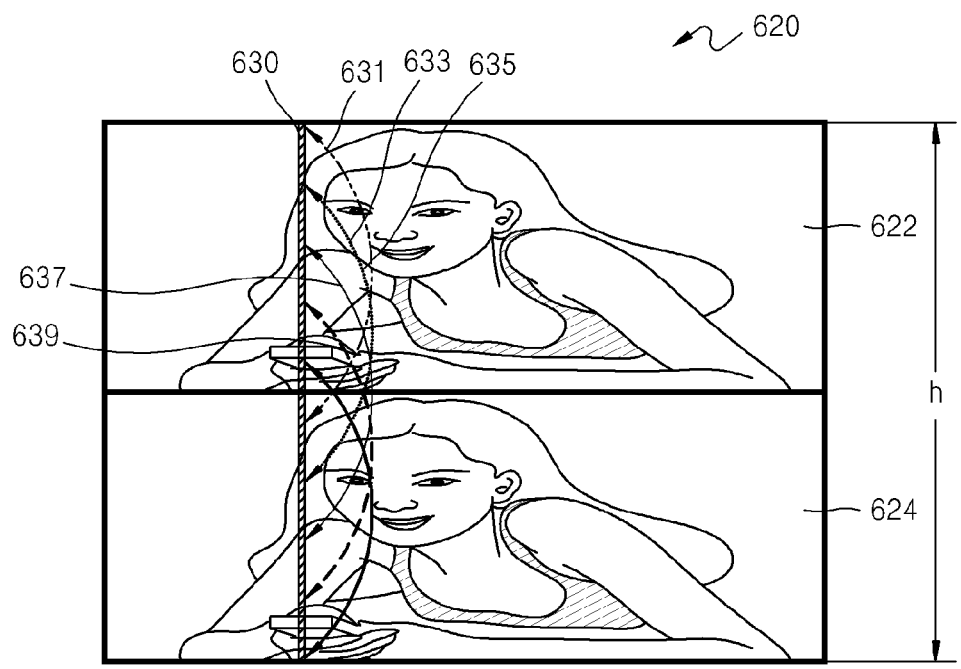
FIG. 6B is a diagram illustrating a method of estimating disparity information between upper and lower regions of 3D video, according to an exemplary embodiment.

FIG. 6B is a diagram illustrating a method of estimating the disparity information between the upper and lower regions of 3D video, according to an exemplary embodiment.

The format determination unit 120 of FIG. 1 divides the 3D video frame into the upper and lower regions, calculates the difference between the values of pixels of the upper and lower regions, and determines whether a disparity between the upper and lower regions corresponds to a disparity occurring in the 3D video having the top and bottom format to determine whether the 3D video is the top and bottom format.

In the 3D video having the top and bottom format, the upper and lower regions correspond to the left-viewpoint video and the right-viewpoint video. A disparity occurs in a pair of the corresponding left-viewpoint video pixel and right-viewpoint video pixel that are captured from the same location.

Referring to FIG. 6B, in a 3D video frame 620 having the top and bottom format, an upper region 622 and a lower region 624 correspond to the left-viewpoint video and the right-viewpoint video, respectively. In the 3D video frame 620, a plurality of combinations 631, 633, 635, 637, and 639 of the corresponding left-viewpoint video pixels and right-viewpoint video pixels at a predetermined vertical line 630 is present. A disparity of at least a predetermined amount may occur in each of the combinations 631, 633, 635, 637, and 639 of the corresponding left-viewpoint video pixels and right-viewpoint video pixels.

A difference value between the upper and lower regions 622 and 624 of the 3D video frame 620 may be calculated as follows:

$$I_{diff}(i,j)=|I(i,j)-I(i+h/2,j)| \quad (2),$$

where h denotes the entire height of the 3D video frame 620, and $I_{diff}(i,j)$ denotes a pixel value of an absolute differential image between the upper and lower regions 622 and 624. A disparity between pairs of the corresponding left-viewpoint video pixels and right-viewpoint video pixels may be estimated from the absolute differential image between the upper and lower regions 622 and 624.

That is, the format determination unit 120 calculates an absolute value of the difference between pairs of the corresponding pixels of the upper and lower regions 622 and 624 at the same vertical line of the input video. If the total number of pairs of the corresponding consecutive pixels having at least a predetermined absolute value is equal to or greater than a predetermined number, a section in which the pairs of the corresponding consecutive pixels are present may be estimated to be a disparity section in which a disparity occurs.

When a disparity section in the 3D video, the format of which is not the top and bottom format is determined as described above, information of an upper region of the 3D video is substantially different from that of a lower region thereof, and thus, a disparity between the upper and lower regions is great. If the information of the disparity section is less than a threshold, the 3D video format may be determined to be the top and bottom format, and if this information is equal to or greater than the threshold, the 3D video format may be determined not to be the top and bottom format.

Figure 6C:
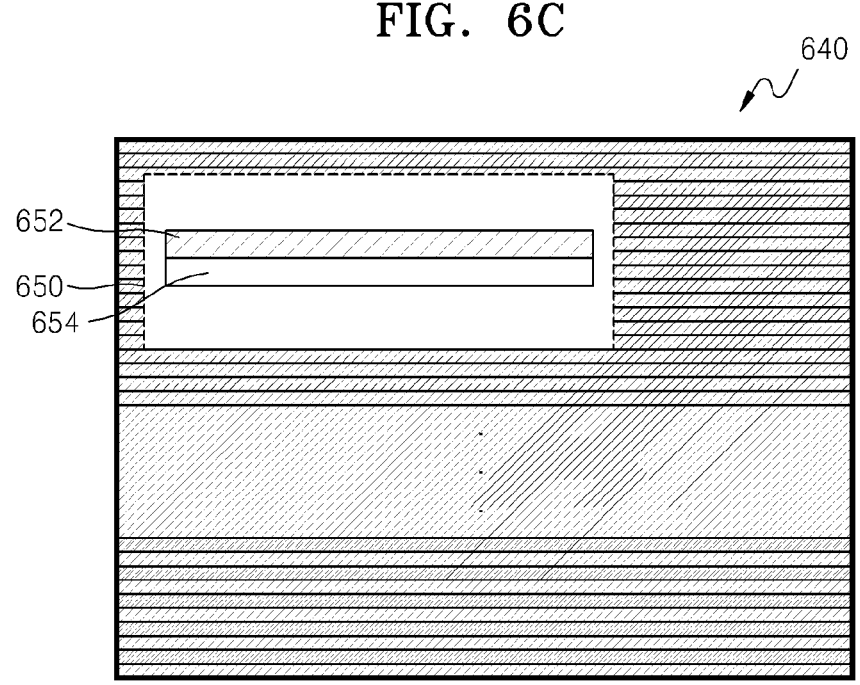
FIG. 6C is a diagram illustrating a method of estimating disparity information regarding horizontal lines of 3D video, according to an exemplary embodiment.

FIG. 6C is a diagram illustrating a method of estimating the disparity information regarding horizontal lines of 3D video, according to an exemplary embodiment.

The format determination unit 120 of FIG. 1 divides the input 3D video frame into portions in units of horizontal lines, estimates a disparity in the input 3D video on a basis of the horizontal lines, and checks whether the disparity corresponds to a disparity occurring in the 3D video having the horizontal line interleaved format to determine whether a 3D video format of the 3D video is the horizontal line interleaved format.

In the 3D video having the horizontal line interleaved format, odd-numbered horizontal lines and even-numbered horizontal lines correspond to the left-viewpoint video data and the right-viewpoint video data, respectively.

Referring to FIG. 6C, in an enlarged region 650 of consecutive horizontal lines of the 3D video frame 640 having the horizontal line interleaved format, an odd-numbered horizontal line 652 and an even-numbered horizontal line 654 correspond to the left-viewpoint video data and the right-viewpoint video data, respectively. In the 3D video frame 640, a disparity of at least a predetermined amount may occur between the corresponding odd-numbered horizontal line 652 and even-numbered horizontal line 654.

A difference value between the odd-numbered horizontal line 652 and the even-numbered horizontal line 654 may be calculated as follows:

$$I_{diff}(i,j)=|I(i\times 2,j)-I(i\times 2+1,j)| \quad (3),$$

where $I_{diff}(i,j)$ denotes a pixel value of an absolute differential image between the horizontal lines 652, 654 of the 3D video frame 640. A disparity between a pair of the corresponding left-viewpoint video horizontal line and the right-viewpoint video horizontal line may be estimated from the pixel value of the absolute differential image.

If an absolute value of the difference between an odd-numbered horizontal line and an even-numbered horizontal line of the input 3D video is equal to or greater than a predetermined value in a section having a plurality of consecutive horizontal lines, the format determination unit 120 may estimate this section to be a disparity section in which a disparity occurs in the horizontal line interleaved format.

When a disparity section in the 3D video, the format of which is not the horizontal line interleaved format, is determined as described above, information of an odd-numbered horizontal line is substantially similar to that of an even-numbered horizontal line, and thus, a disparity between the odd-numbered horizontal line and the even-numbered horizontal line is small. If information regarding the disparity section is equal to or greater than a threshold, the 3D video format may be determined to be the horizontal line interleaved format, and if this information is less than the threshold, the 3D video format may be determined not to be the horizontal line interleaved format.

Figure 6D:
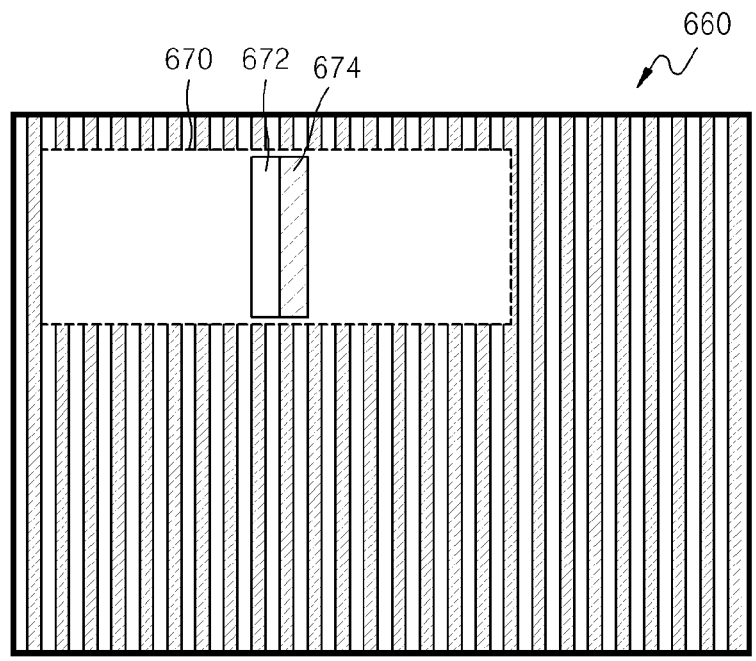
FIG. 6D is a diagram illustrating a method of estimating disparity information regarding vertical lines of 3D video, according to an exemplary embodiment.

FIG. 6D is a diagram illustrating a method of estimating the disparity information regarding vertical lines of the 3D video, according to an exemplary embodiment.

The format determination unit 120 of FIG. 1 divides the input 3D video frame into portions in units of vertical lines, estimates a disparity in the input 3D video on a basis of the vertical lines, and checks whether the disparity corresponds to a disparity occurring in the 3D video having the vertical line interleaved format to determine whether a 3D video format of the input 3D video is the vertical line interleaved format.

In the 3D video having the vertical line interleaved format, odd-numbered vertical lines and even-numbered vertical lines correspond to the left-viewpoint video data and the right-viewpoint video data, respectively.

Referring to FIG. 6D, in an enlarged region 670 of consecutive vertical lines of the 3D video frame 660 having the vertical line interleaved format, an odd-numbered vertical line 672 and an even-numbered vertical line 674 correspond to the left-viewpoint video data and the right-viewpoint video data, respectively. In the 3D video frame 660, a disparity of at least a predetermined amount may occur between the corresponding odd-numbered vertical line 672 and the even-numbered vertical line 674.

A difference value between the odd-numbered vertical line 672 and the even-numbered vertical line 674 may be calculated as follows:

$$I_{dif}(i,j)=|I(i,j\times 2)-I(i,j\times 2+1)| \quad (4),$$

where $I_{dif}(i,j)$ denotes a pixel value of an absolute differential image between the vertical lines 672, 674 of the 3D video frame 660. A disparity between the corresponding left-viewpoint video vertical line and right-viewpoint video vertical line may be estimated from the pixel value of the absolute differential image.

If an absolute value of the difference between an odd-numbered vertical line and an even-numbered vertical line of the input 3D video is equal to or greater than a predetermined value in a section having a plurality of consecutive vertical lines, the format determination unit 120 may estimate this section to be a disparity section in which a disparity occurs in the vertical line interleaved format.

When a disparity section in the 3D video, the format of which is not the vertical line interleaved format is determined as described above, information of an odd-numbered vertical line is substantially similar to that of an even-numbered vertical line, and thus, a disparity between the odd-numbered vertical line and the even-numbered vertical line is small. If the information regarding the disparity section is equal to or greater than a threshold, the 3D video format may be determined to be the vertical line interleaved format, and if this information is less than the threshold, the 3D video format may be determined not to be the vertical line interleaved format.

Figure 7A:
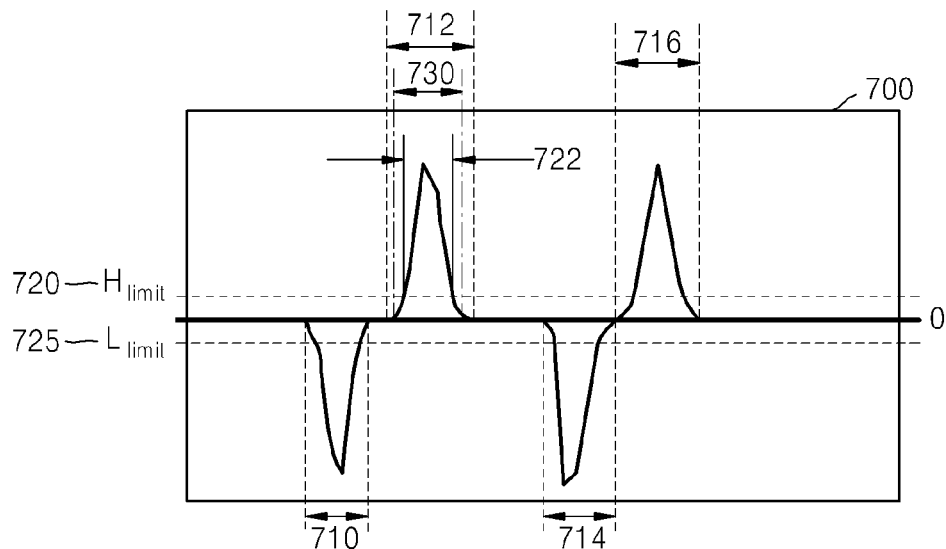
FIG. 7A is a graph illustrating a method of estimating a disparity section in 3D video, according to an exemplary embodiment.

FIG. 7A is a graph 700 illustrating a method of estimating a disparity section in the 3D video, according to an exemplary embodiment.

Here, the disparity section is a section of an absolute differential image between two regions being respectively estimated to be the left-viewpoint video and the right-viewpoint video, in which the differences between consecutive pixels are equal to or greater than a predetermined value. The width of the disparity section is related to the correlation between the left-viewpoint video and the right-viewpoint video.

The graph 700 shows the difference values between the pairs of the corresponding pixels or lines of the left-viewpoint video and the right-viewpoint video. The horizontal axis of the graph 700 denotes the indexes of the pairs of the corresponding pixels or lines of the left-viewpoint video and the right-viewpoint video, and the vertical axis of the graph 700 denotes the difference values between positive and negative values with respect to 0.

The difference values between the pairs of the corresponding pixels or lines of the left-viewpoint video and the right-viewpoint video may include sections 710, 712, 714, and 716 in which a disparity occurs continuously. A part of each of the sections 712 and 716 in which a positive disparity occurs continuously, may be selected as a disparity section when the graph has values greater than an upper limit threshold $H_{limit}$ 720 and has a width less than or equal to a maximum width 730. For example, a part 722 of the section 712 in which a positive disparity occurs continuously, may be selected as a disparity section, since the part 722 has graph values greater than the upper limit threshold $H_{limit}$ 720 and has a width less than or equal to the maximum width 730. Likewise, a part of each of the sections 710 and 714 in which a negative disparity occurs continuously, may be selected as a disparity section when the part has graph values less than a lower limit threshold $L_{limit}$ 725 and has a width less than or equal to the maximum width 730.

That is, a disparity between the left-viewpoint video and the right-viewpoint video is not calculated directly using a disparity estimation process but is estimated indirectly, based on the information regarding consecutive pixels or lines in which an absolute value of the difference value between the left-viewpoint video and the right-viewpoint video is large.

A region corresponding to the left-viewpoint video may not be the same as a region corresponding to the right-viewpoint video because of inconsistencies in positions and the distances between the left-viewpoint and right-viewpoint cameras, etc. Thus, a disparity may be considered to occur between the left-viewpoint video and the right-viewpoint video only when the difference value between the left-viewpoint video and the right-viewpoint video is either greater than an upper limit threshold $H_{limit}$ or is less than a lower limit threshold $L_{limit}$. Also, when a section in which a disparity occurs continuously has a width equal to or greater than a predetermined value, the section may be selected as a candidate disparity section. The total number of candidate disparity sections detected in the 3D video is counted.

The total number of candidate disparity sections between the left and right regions of the 3D video may be compared with that of the candidate disparity sections between the upper and lower regions of the 3D video, and a 3D video format of the 3D video may be determined to be the side by side format or the top and bottom format according to the result of comparison.

Also, the total number of the candidate disparity sections between an odd-numbered horizontal lines and the even-numbered horizontal lines of the 3D video may be compared with that of the candidate disparity sections between the odd-numbered vertical lines and the even-numbered vertical lines of the 3D video, and the 3D video format of the 3D video may be determined to be the horizontal line interleaved format or the vertical line interleaved format according to the result of the comparison.

Figure 7B:
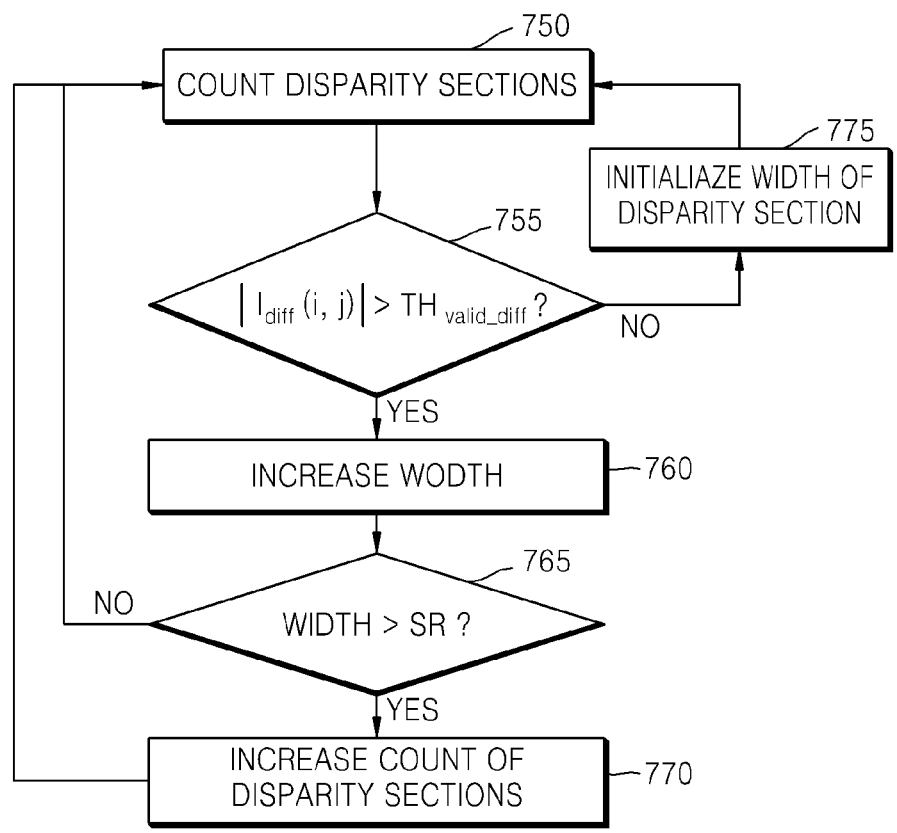
FIG. 7B is a flowchart illustrating a method of estimating disparity information, according to an exemplary embodiment.

FIG. 7B is a flowchart illustrating a method of estimating the disparity information, according to an exemplary embodiment.

In the method of FIG. 7B, the format determination unit 120 of FIG. 2 may count the total number of candidate disparity sections in the 3D video, and determine a 3D video format of the 3D video according to the total number.

Specifically, referring to FIG. 7B, in operation 750, the total number of continuous disparity sections in which a disparity occurs is counted with respect to a pixel value $I_{diff}(i, j)$ of the differential image between the left-viewpoint video and the right-viewpoint video of the 3D video.

In operation 755, an absolute value of the pixel value of the differential image between the left-viewpoint video and the right-viewpoint video is compared with a threshold $TH_{valid\_diff}$ ($|I_{diff}(i,j)|>TH_{valid\_diff}$?). In operation 755, the critical value $TH_{valid\_diff}$ corresponds to an absolute value of the upper limit threshold $H_{limit}$ 720 or the lower limit threshold $L_{limit}$ 725 illustrated in FIG. 7A. If the absolute value $|I_{diff}(i,j)|$ of the pixel value $I_{diff}(i, j)$ of the differential image is less than or equal to the critical value $TH_{valid\_diff}$, then the width of the continuous disparity section is initialized in operation 775, and the total number of disparity sections is counted with respect to a next pixel of the differential image in operation 750.

If it is determined in operation 755 that the absolute value $|I_{diff}(i, j)|$ is greater than the critical value $TH_{valid\_diff}$, the width of the disparity section is increased in operation 760.

In operation 765, the total number of disparities, i.e., the width of the disparity section, is compared with a maximum width of disparity section SR (a search range). If it is determined in operation 765 that the width of the disparity section is not greater than the maximum width of disparity section SR, then the disparity section is not selected as a candidate disparity section and the total number of disparity sections is counted with respect to a next pixel of the differential image in operation 750.

If it is determined in operation 765 that the width of continuous disparity section is greater than the maximum width of disparity section SR, the number of candidate disparity sections DRcount is increased in operation 770. Then, the method returns back to operation 750, and the total number of disparity sections is counted with respect to a next pixel of the differential image.

When a 3D video format of the left and right regions or the upper and lower regions of the 3D video is determined, if the total number of candidate disparity sections DRcount of the left and right regions of the 3D video is less than a threshold $TH_{SBS\_DRcount}$, then the format determination unit 120 may determine the 3D video format to be the side by side format. Here, the threshold $TH_{SBS\_DRcount}$ denotes a threshold of the total number of disparity sections, which is used to determine whether the 3D video format is the side by side format.

Also, if the total number of candidate disparity sections DRcount of the upper and lower regions of the 3D video is less than a threshold $TH_{TNB\_DRcount}$, the format determination unit 120 may determine the 3D video format to be the top and bottom format. The threshold $TH_{TNB\_DRcount}$ denotes a threshold of the total number of disparity sections, which is used to determine whether the 3D video format is the top and bottom format.

When a 3D video format of consecutive lines of the 3D video is determined, if the total number of candidate disparity sections DRcount of the horizontal lines of the 3D video is greater than a threshold $TH_{HOR\_DRcount}$, the format determination unit 120 may determine the 3D video format to be the horizontal line interleaved format. The threshold $TH_{HOR\_DRcount}$ denotes a threshold of the total number of candidate disparity sections, which is used to determine whether the 3D video format is the horizontal line interleaved format.

If the total number of candidate disparity sections DRcount of the vertical lines of the 3D video is greater than a threshold $TH_{VER\_DRcount}$, the format determination unit 120 may determine the 3D video format to be the vertical line interleaved format. The threshold $TH_{VER\_DRcount}$ denotes a threshold of the total number of candidate disparity sections, which is used to determine whether the 3D video format is the vertical line interleaved format.

When a 3D video format of the left and right regions or the upper and lower regions of the 3D video is determined, a large disparity section may be estimated to be a disparity between a plurality of pieces of video that are less correlated to each other. Thus, when the total number of candidate disparity sections is less than a threshold $TH_{DRcount}$ of the total number of disparity sections, it is highly probable that the 3D video format is the side by side format or the top and bottom format.

However, since consecutive horizontal or vertical lines of the interleaved formats are mixed artificially in the left-viewpoint video and the right-viewpoint video, horizontal lines are greatly different from vertical lines. Thus, if the total number of candidate disparity sections is greater than the threshold $TH_{DRcount}$ of the total number of disparity sections when a 3D video format of a horizontal or vertical line of 3D video is determined, the 3D video format is highly probably the horizontal line interleaved format or the vertical line interleaved format.

Figure 8A:
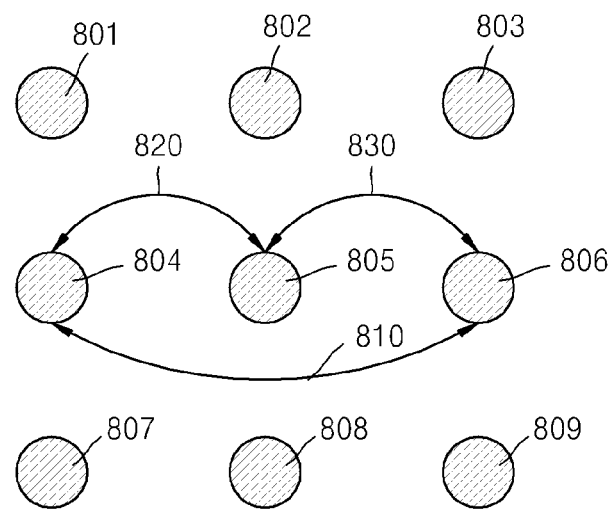
FIG. 8A illustrates a method of estimating correlation information between horizontal pixel values, according to an exemplary embodiment.
Figure 8B:
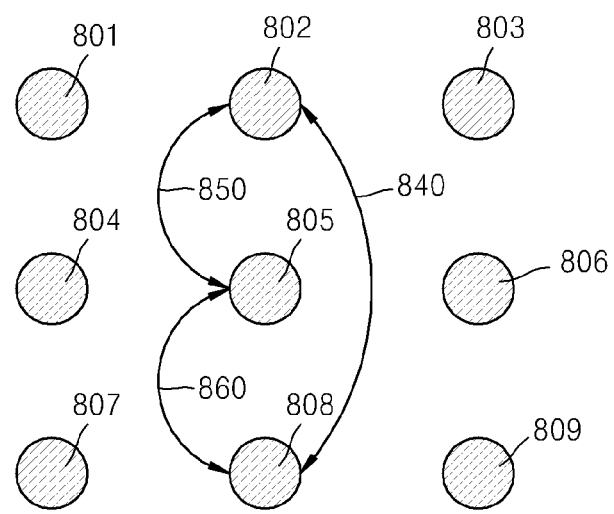
FIG. 8B illustrates a method of estimating correlation information between vertical pixel values, according to an exemplary embodiment.

FIG. 8A illustrates a method of estimating the correlation information between the horizontal pixel values, according to an exemplary embodiment. FIG. 8B illustrates a method of estimating correlation information between the vertical pixel values, according to an exemplary embodiment.

The format determination unit 120 of FIG. 1 may determine a 3D video format of 3D video in which the left-viewpoint video and the right-viewpoint video are mixed together in units of pixels, based on the correlation between the values of the horizontal pixels and the correlation between the values of the vertical pixels.

According to an exemplary embodiment, the format determination unit 120 may use the ratio of the differences between neighboring pixel values as the correlation information between neighboring pixel values. Thus, the ratio of the differences between the values of consecutive pixels arranged in the vertical direction may be used as the correlation information between the vertical pixel values, and the ratio of the differences between the values of consecutive pixels arranged in the horizontal direction may be used as the correlation information between the horizontal pixel values. Hereinafter, the ratio of the differences between the values of consecutive pixels arranged in the vertical direction will be referred to as 'a ratio of the differences between vertical pixel values', and the ratio of the differences between the values of consecutive pixels arranged in the horizontal direction will be referred to as 'a ratio of the differences between horizontal pixel values'.

Referring to FIG. 8A, the ratio of the differences between the horizontal pixels may be calculated from the ratio of the differences between the values of first, second, and third horizontal pixels selected from 3×3 pixels 801, 802, 803, 804, 805, 806, 807, 808, and 809 of the 3D video frame. The ratio of the differences between the horizontal pixel values may be calculated as follows:

$$Val_{hor}(i,j)=(|I(i-1,j)-I(i,j)|+|I(i,j)-I(i+1,j)|)/(|I(i-1,j)-I(i+1,j)|+c) \quad (5),$$

where $Val_{hor}(i,j)$ denotes the ratio of the differences between the horizontal pixel values, and c denotes a constant value that prevents a denominator from being zero. Regarding the first, second, and third pixels 804, 805, and 806 that are arranged sequentially in parallel in the horizontal direction, an absolute value 810 of the difference between the left (first) pixel 804 and the right (third) pixel 806 corresponds to the first term of the denominator of Equation (5), an absolute value 820 of the difference between the left (first) pixel 804 and the center (second) pixel 805 corresponds to the first term of the numerator of Equation (5), and an absolute value 830 of the difference between the center (second) pixel 805 and the right (third) pixel 806 corresponds to the second term of the numerator of Equation (5).

That is, the ratio of the differences between the horizontal pixel values $Val_{hor}(i,j)$ is the ratio of the sum of the absolute value 820 of the difference between the first pixel 804 and the second pixel 805 and the absolute value 830 of the difference between the second pixel 805 and the third pixel 806 and the absolute value 810 of the difference between the first pixel 804 and the third pixel 806.

Referring to FIG. 8B, similarly, the ratio of the differences between the vertical pixel values may be calculated from the ratio of the differences between the values of three pixels that are arranged in parallel in the vertical direction. The ratio of the differences between the vertical pixel values may be calculated as follows:

$$Val_{ver}(i,j)=(|I(i,j-1)-I(i,j)|+|I(i,j)-I(i,j+1)|)/(|I(i,j-1)-I(i,j+1)|+c) \quad (6),$$

where $Val_{ver}(i,j)$ denotes the ratio of the differences between the vertical pixel values, and c denotes a constant value that prevents a denominator from being zero. Regarding fourth, fifth, and sixth pixels 802, 805, and 808 that are arranged sequentially in parallel in the vertical direction, an absolute value 840 of the difference between the upper (fourth) pixel 802 and the lower (sixth) pixel 808 corresponds to the first term of the denominator of Equation (6), an absolute value 850 of the difference between the upper (fourth) pixel 802 and the middle (fifth) pixel 805 corresponds to the first term of the numerator of Equation (6), and an absolute value 860 of the difference between the middle (fifth) pixel 805 and the lower (sixth) pixel 808 corresponds to the second term of the numerator of Equation (6).

That is, the ratio $Val_{ver}(i,j)$ of the differences between the vertical pixel values is the ratio of the sum of the absolute value 850 of the difference between the fourth pixel 802 and the fifth pixel 805 and the absolute value 860 of the difference between the fifth pixel 805 and the sixth pixel 808 and the absolute value 840 of the difference between the fourth pixel 802 and the sixth pixel 808.

If Equations (5) and (6) are used, the format determination unit 120 may calculate the ratio $Val_{hor}$ of the differences between the horizontal pixel values and the ratio $Val_{ver}$ of the differences between the vertical pixel values with respect to the 2D video, thereby preventing the 2D video from being erroneously determined to be the 3D video at a boundary line of the 2D video when a 3D video format is determined. When Equations (5) and (6) are applied to a boundary line of the video, a numerator has a large value but a denominator also has a large value. Accordingly, the ratio $Val_{hor}$ of the differences between the horizontal pixel values and the ratio $Val_{ver}$ of the differences between the vertical pixel values at a boundary line of the 2D video are no more greater than those of the other parts of the 2D video.

Since the 3D video includes pixels each corresponding to the left-viewpoint video or the right-viewpoint video, the denominator terms of Equations (5) and (6) correspond to an absolute difference value between the pixels of the video captured from the same viewpoint and thus have a small value. However, the numerator terms thereof correspond to absolute difference values between the pixels of a plurality of pieces of the video captured from different viewpoints and have values greater than the value of the denominator terms. Thus, the ratio of the differences between the horizontal pixel values given in Equation (5) and the ratio of the differences between the vertical pixel values given in Equation (6) have a large value when the 3D video has a 3D video format in which the left-viewpoint video data and the right-viewpoint video data are alternately repeated in units of pixels.

FIG. 9 is a table showing results of determining a 3D video format based on correlation information between the neighboring pixels, according to an exemplary embodiment.

The format determination unit 120 of FIG. 1 may calculate, as the correlation information between the neighboring pixel values, the ratios of the differences between the horizontal pixel values and the ratios of the differences between the vertical pixel values with respect to the entire or a part of input video, and may count the ratios of the differences between the horizontal pixel values and the ratios of the differences between the vertical pixel values that are greater than a threshold of the ratio of the differences between the pixel values. The format determination unit 120 may compare the count results and may determine a 3D video format of the input video to be the horizontal line interleaved format, the vertical line interleaved format, or the checker board format.

Specifically, if the total number of the ratios of the differences between the horizontal pixel values that are greater than the threshold of the differences between pixel values is $Num_{hor}(i, j)$, the total number of the ratios of the differences between the vertical pixel values that are greater than the threshold of the differences between the pixel values is $Num_{ver}(i, j)$, and a predetermined threshold $TH_{pel\_count}$ is given, then the count results show Cases 1, 2, and 3 as follows:

Case 1: The total number $Num_{hor}(i, j)$ of the ratios of the differences between the horizontal pixel values that are greater than the threshold of the differences between the pixel values is greater than the predetermined threshold $TH_{pel\_count}$ ($Num_{hor}(i, j) > TH_{pel\_count}$), and the total number $Num_{ver}(i, j)$ of the ratios of the differences between the vertical pixel values that are greater than the threshold of the differences between the pixel values is less than the predetermined threshold $TH_{pel\_count}$ ($Num_{ver}(i, j) < TH_{pel\_count}$).

Case 2: The total number $Num_{hor}(i, j)$ of the ratios of the differences between the horizontal pixel values that are greater than the threshold of the differences between the pixel values is less than the predetermined threshold $TH_{pel\_count}$ ($Num_{hor}(i, j) < TH_{pel\_count}$), and the total number $Num_{ver}(i, j)$ of the ratios of the differences between the vertical pixel values that are greater than the threshold of the differences between the pixel values is greater than the predetermined threshold $TH_{pel\_count}$ ($Num_{ver}(i, j) > TH_{pel\_count}$).

Case 3: The total number $Num_{hor}(i,j)$ of the ratios of the differences between the horizontal pixel values and the total number $Num_{ver}(i, j)$ of the ratios of the differences between the vertical pixel values, which are greater than the threshold of the differences between the pixel values, are greater than the predetermined threshold ($\text{Num}_{hor}(i, j) > \text{TH}_{pel\_count}$, $\text{Num}_{ver}(i,j) > \text{TH}_{pel\_count}$).

If the total number $\text{Num}_{hor}(i, j)$ of the ratios of the differences between the horizontal pixel values that are greater than the threshold of the differences between the pixel values is less than the predetermined threshold $\text{TH}_{pel\_count}$, then the correlation between the pixels on the horizontal lines may be determined to be high. If the total number $\text{Num}_{ver}(i, j)$ of the ratios of the differences between the vertical pixel values that are greater than the threshold of the differences between the pixel values is less than the predetermined threshold $\text{TH}_{pel\_count}$, then the correlation between the pixels on the vertical lines may be determined to be high. It is possible to estimate whether the horizontal or vertical lines correspond to the left-viewpoint video and the right-viewpoint video of the 3D video, respectively, according to the correlations between the pixels on the horizontal lines and between the pixels on the vertical lines.

Accordingly, the format determination unit 120 may calculate the ratios of the differences between the horizontal pixel values and the ratios of the differences between the vertical pixel values of the input video, and may determine whether the input video is the 3D video and determine a 3D video format of the input video according to the calculated ratios.

When the total number $\text{Num}_{hor}(i, j)$ of the ratios of the differences between the horizontal pixel values that are greater than the threshold of the differences between the pixel values is greater than the predetermined threshold $\text{TH}_{pel\_count}$ (Case 1), the format determination unit 120 may determine that the correlation between the pixels on the horizontal lines is low and the correlation between the pixels on the vertical lines is high. It is possible to estimate whether the vertical lines correspond to the left-viewpoint video and the right-viewpoint video of the 3D video according to the high correlation between pixels thereon. Accordingly, the format determination unit 120 determines the 3D video format of the input video to be the vertical line interleaved format.

When the total number $\text{Num}_{ver}(i,j)$ of the ratios of the differences between the vertical pixel values that are greater than the threshold of the differences between the pixel values is greater than the predetermined threshold $\text{TH}_{pel\_count}$ (Case 2), the format determination unit 120 may determine that the correlation between the pixels on the horizontal lines is high and the correlation between the pixels on the vertical lines is low. It is possible to estimate whether the horizontal lines correspond to the left-viewpoint video and right-viewpoint video of the 3D video according to the high correlation between the pixels thereon. Accordingly, the format determination unit 120 determines the 3D video format of the input video to be the horizontal line interleaved format.

When both the total number $\text{Num}_{hor}(i, j)$ of the ratios of the differences between the horizontal pixel values and the total number $\text{Num}_{ver}(i, j)$ of the ratios of the differences between the vertical pixel values that are greater than the threshold of the differences between the pixel values are greater than the predetermined threshold $\text{TH}_{pel\_count}$ (Case 3), the format determination unit 120 may determine that the correlations between the pixels on the horizontal lines and between the pixels on the vertical lines are low. Accordingly, the format determination unit 120 determines the 3D video format of the input video to be the checker board format.

In the current exemplary embodiment, the format determination unit 120 uses the ratios of the differences between the neighboring pixel values as an example of the correlation information between the neighboring pixels but a method of determining the correlation between neighboring pixels of a target pixel of input video according to the inventive concept is not limited thereto. Various factors, such as the ratio of, a variation in, a dispersion of, or a standard deviation of pixel values, may be used to determine the correlation between the neighboring pixels.

FIG. 10A illustrates a 3D video frame 1000 having the top and bottom format, according to an exemplary embodiment. FIG. 10B illustrates a portion 1040 surrounding a boundary line 1030 between an upper region 1010 and a lower region 1020 of the 3D video frame 1000 in more detail, according to an exemplary embodiment.

In the 3D video frame 1000 having the top and bottom format, the upper region 1010 and the lower region 1020 may include the left-viewpoint video and the right-viewpoint video, respectively. In this case, a line of discontinuity occurs at the horizontal boundary line 1030 between the upper region 1010 and the lower region 1020.

Referring to FIG. 10B, in the portion 1040 around the boundary line 1030, horizontal lines 1012 and 1014 are disposed in the upper region 1010 and horizontal lines 1022 and 1024 are disposed in the lower region 1020. In the 3D video frame 1000, the horizontal lines 1012 and 1014 include video data obtained from the same viewpoint, and the horizontal lines 1022 and 1024 include video data obtained from the same viewpoint. However, the horizontal lines 1012 and 1022 adjacent to the boundary line 1030 have video data obtained from different viewpoints. Two adjacent pixels 1052 and 1054 are disposed perpendicular to an upper part of the horizontal boundary line 1030, and two adjacent pixels 1072 and 1074 are disposed perpendicular to a lower part of the horizontal boundary line 1030.

Thus, the difference value $\text{diff}_{bound}$ 1060 between a pixel 1052 on the horizontal line 1012 and a pixel 1072 on the horizontal line 1022 is relatively large, while the difference value $\text{diff}_{upper}$ 1050 between the pixel 1052 on the horizontal line 1012 and a pixel 1054 on the horizontal line 1014 and the difference value $\text{diff}_{lower}$ 1070 between the pixel 1072 on the horizontal line 1022 and a pixel 1074 on the horizontal line 1024 are relatively small.

Accordingly, the difference values between the upper lines and between the lower lines with respect to a boundary line between the upper and lower regions of the input video are calculated. Whether the input video is a 3D video is determined based on the difference values, and a 3D video format of the input video is also determined.

$$\text{Bound}_{hor} = \Sigma |\text{diff}_{bound}| / (|\text{diff}_{upper}| + |\text{diff}_{lower}| + c) \qquad (7),$$

where $\text{Bound}_{hor}$ denotes the amount of discontinuity between the horizontal lines around the boundary line between the upper and lower regions. The amount of discontinuity $\text{Bound}_{hor}$ is calculated with respect to the entire or a part of the boundary line and the results of calculating are added in units of pixels. That is, the amount of discontinuity $\text{Bound}_{hor}$ is obtained by calculating the ratios of an absolute difference value $|\text{diff}_{bound}|$ between two adjacent pixels 1052, 1072 disposed below and above, perpendicularly to the boundary line 1030 and a sum $|\text{diff}_{upper}| + |\text{diff}_{lower}|$ of absolute values of the difference values $\text{diff}_{upper}$ between two adjacent pixels 1052, 1054 of the upper region 1010 and absolute values of the difference values $\text{diff}_{lower}$ between two adjacent pixels 1072, 1074 of the lower region 1020 disposed perpendicularly to the boundary line 1030, and then summing the ratios.

The format determination unit 120 may calculate the amount of discontinuity $\text{Bound}_{hor}$ at the boundary line between the upper and lower regions of the input video, and compare it with a threshold $\text{TH}_{horBound}$ of discontinuity. If the amount of discontinuity Bound$_{hor}$ is greater than the threshold TH$_{horBound}$ of discontinuity, the format determination unit 120 may determine a 3D video format of the input video to be the top and bottom format.

Figure 11A:
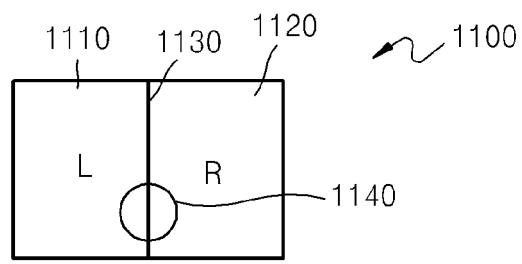
FIG. 11A illustrates 3D video having a side by side format, according to an exemplary embodiment.
Figure 11B:
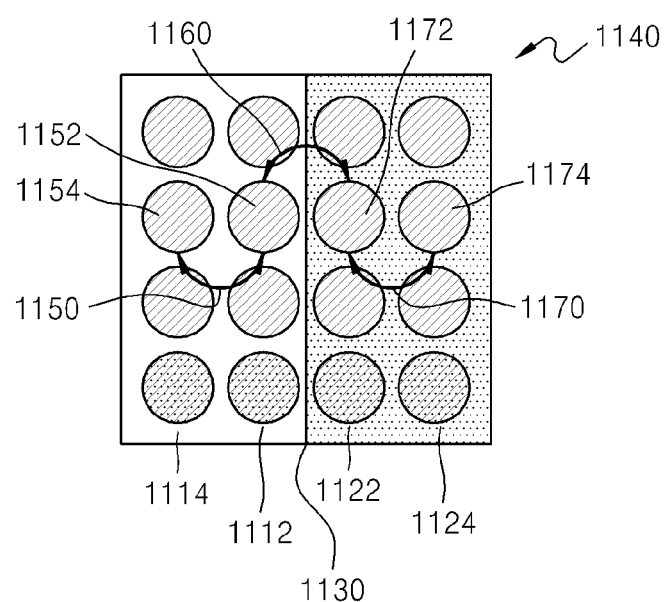
FIG. 11B illustrates a part of a boundary line between a left region and a right region of the 3D video of FIG. 11A in more detail, according to an exemplary embodiment.

FIG. 11A illustrates 3D video frame 1100 having the side by side format, according to an exemplary embodiment. FIG. 11B illustrates a portion 1140 surrounding a boundary line between a left region 1110 and a right region 1120 of the 3D video frame 1100 in more detail, according to an exemplary embodiment.

In the 3D video frame 1100 having the side by side format, the left region 1110 and the right region 1120 may have the left-viewpoint video and the right-viewpoint video, respectively. In this case, a line of discontinuity occurs at the vertical boundary line 1130 between the left region 1110 and the right region 1120.

Referring to FIG. 11B, in the portion 1140 surrounding the boundary line 1130, vertical lines 1112 and 1114 are disposed in the left region 1110 and vertical lines 1122 and 1124 are disposed in the right region 1120. Two adjacent pixels 1152 and 1154 are disposed perpendicular to the left edge of the vertical boundary line 1130, and two adjacent pixels 1172 and 1174 are disposed perpendicular to the right edge of the vertical boundary line 1130.

The difference value diff$_{bound}$ 1160 between a pixel 1152 on the vertical line 1112 and a pixel 1172 on the vertical line 1122 is relatively large, while the difference value diff$_{left}$ 1150 between the pixel 1152 on the vertical line 1112 and a pixel 1154 on the vertical line 1114 and the difference value diff$_{right}$ 1170 between the pixel 1172 on the vertical line 1122 and a pixel 1174 on the vertical line 1124 are relatively small.

Accordingly, the difference values between the left regions and between the right regions with respect to a boundary line between the left and right region of the input video are calculated. Whether the input video is the 3D video is determined based on the difference values, and a 3D video format of the input video is also determined.

$$\text{Bound}_{ver} = \Sigma |\text{diff}_{bound}|/(|\text{diff}_{left}|+|\text{diff}_{right}|+c) \quad (8),$$

where Bound$_{ver}$ denotes the amount of discontinuity between the vertical lines around the boundary line between the upper and lower region. The amount of discontinuity Bound$_{ver}$ is calculated with respect to the entire or a part of the boundary line and the results of calculating are added in units of pixels. That is, the amount of discontinuity Bound$_{ver}$ is obtained by calculating the ratios of an absolute difference value |diff$_{bound}$| between two adjacent pixels 1152, 1172 disposed to the left and to the right of and perpendicularly to the boundary line 1130 and the sums |diff$_{left}$|+|diff$_{right}$| of absolute values of the difference values diff$_{left}$ between two adjacent pixels 1152, 1154 of the left region 1110 and absolute values of the difference values diff$_{right}$ between two adjacent pixels 1122, 1124 of the right region 1120 disposed perpendicularly to the boundary line 1130, and then summing the ratios.

The format determination unit 120 may calculate the amount of discontinuity Bound$_{ver}$ at the boundary line between the left and right regions of the input video and compare it with a threshold TH$_{verBound}$ of discontinuity. If the amount of discontinuity Bound$_{ver}$ is greater than the threshold TH$_{verBound}$ of discontinuity, the format determination unit 120 may determine a 3D video format of the input video to be the side by side format.

Figure 12A:
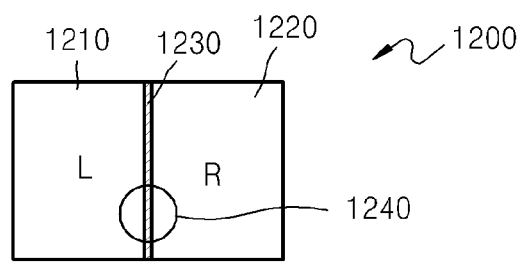
FIG. 12A illustrates 3D video that has a boundary region and the side by side format, according to an exemplary embodiment.
Figure 12B:
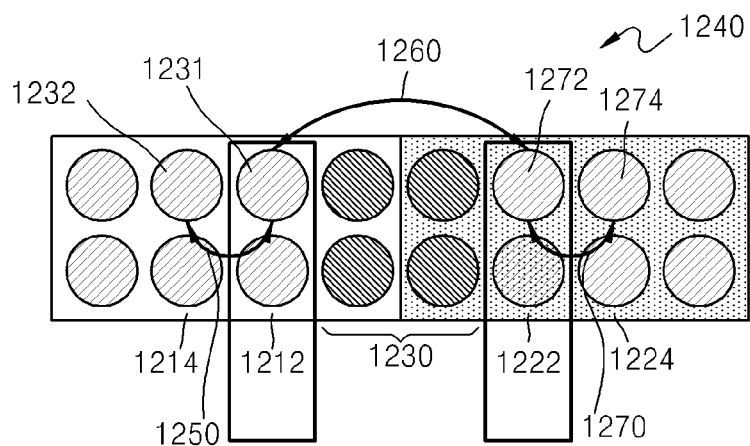
FIG. 12B illustrates a part of the boundary region of the 3D video of FIG. 12A in more detail, according to an exemplary embodiment.

FIG. 12A illustrates 3D video frame 1200 that has a boundary region 1230 and the side by side format, according to an exemplary embodiment. FIG. 12B illustrates a portion 1240 of the boundary region 1230 of the 3D video frame 1200 in more detail, according to an exemplary embodiment.

A plurality of lines of discontinuity having meaningless data may exist at the boundary line between the left and right regions or between the upper and lower regions of 3D video. For example, in the 3D video 1200 having the side by side format, boundary lines between a left region 1210 and a right region 1220 may form the boundary region 1230 having a predetermined width and, for example, black lines.

In the portion 1240 of the boundary region 1230, the vertical lines are illustrated in the left region 1210 and the right region 1220. If the boundary region 1230 has meaningless data, it may be disregarded when calculating the amount of discontinuity Bound$_{ver}$. Thus, the boundary region 1230 is disregarded, and the amount of discontinuity Bound$_{ver}$ is calculated from the difference value diff$_{left}$ 1250 between pixels 1231, 1232 on vertical lines 1212 and 1214 in the left region 1210, the difference value diff$_{right}$ 1270 between pixels 1272, 1274 on vertical lines 1222 and 1224 in the right region 1220, and the difference value diff$_{bound}$ 1260 between pixels 1231, 1272 on the vertical lines 1212 and 1222 located adjacent the boundary region 1230.

As described above with reference to FIGS. 10A to 12B, when the amounts of discontinuity Bound$_{hor}$ and Bound$_{ver}$ of a boundary line in the 3D video are calculated, not only the difference value diff$_{bound}$ between pixels on two lines adjacent to the boundary line is used but also the difference values diff$_{upper}$ between pixels on the lines in an upper region, the difference value diff$_{lower}$ between pixels on the lines in a lower region, the difference value diff$_{left}$ between pixels on the lines in a left region, and the difference value diff$_{right}$ between pixels on the lines in a right region are used. Accordingly, it is possible to prevent a 3D video format from being determined at a boundary region of the 2D video.

Figure 13A:
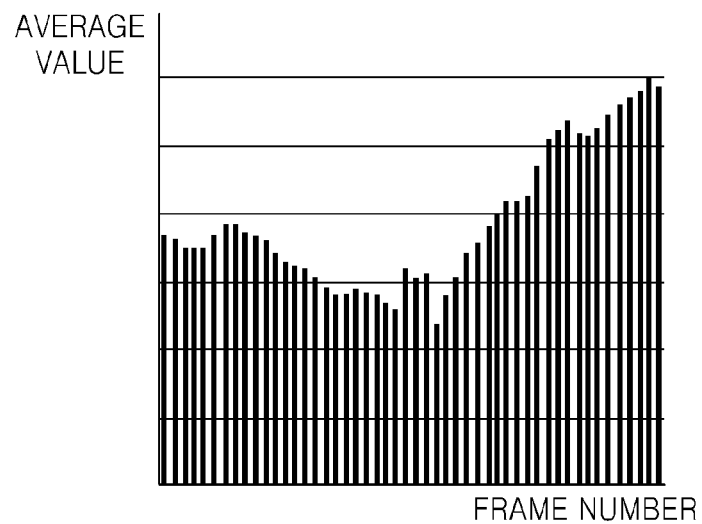
FIG. 13A is a graph showing average values of the differences between pixel values of continuous frames of 2D video on the time axis, according to an exemplary embodiment.
Figure 13B:
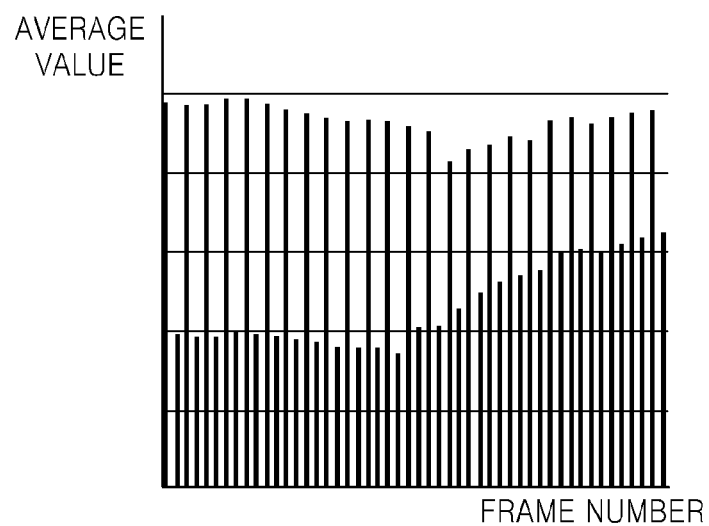
FIG. 13B is a graph showing average values of the differences between pixel values of continuous frames of 3D video having the frame sequential format on the time axis, according to an exemplary embodiment.

FIG. 13A is a graph showing average values of the differences between the pixel values of the consecutive frames of the 2D video on the time axis, according to an exemplary embodiment. FIG. 13B is a graph showing average values of the differences between the pixel values of the consecutive frames of the 3D video having the frame sequential format on the time axis, according to an exemplary embodiment.

Here, the horizontal axes denote the order of frames and the vertical axes denote the average values of the pixel values of each of the frames.

Referring to FIG. 13A, in a 2D video sequence, video captured from the same viewpoint is displayed in units of frames, and thus, the pixel values of the respective frames change relatively continuously according to the order of the frames. However, referring to FIG. 13B, in the 3D video having the frame sequential format, the left-viewpoint video and the right-viewpoint video are alternately arranged in units of frames, and thus, the pixel values of the respective frames change discontinuously. This is because the distribution of pixels is different between the left-viewpoint video and the right-viewpoint video.

Accordingly, the format determination unit 120 of FIG. 1 may determine whether a 3D video format of the input video is the frame sequential format, based on a change in the pixel values of the respective frames of an input video sequence.

Figure 14:
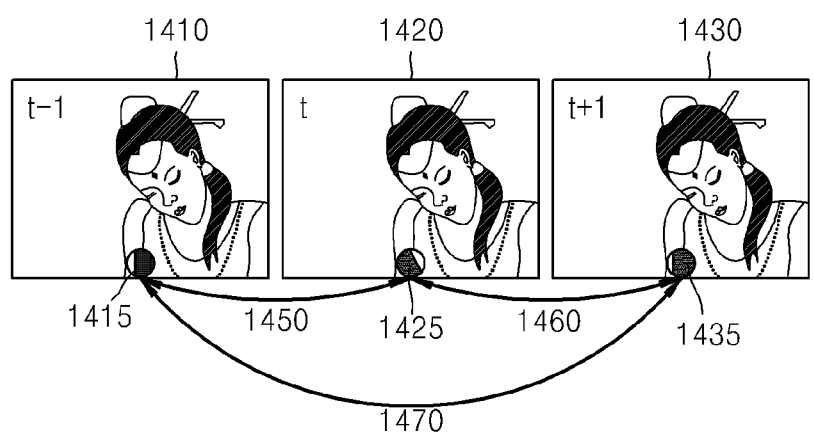
FIG. 14 illustrates a method of determining whether a 3D video format is a frame sequential format by using three continuous frames on the time axis, according to an exemplary embodiment.

FIG. 14 illustrates a method of determining whether a 3D video format is the frame sequential format by using three consecutive frames on the time axis, according to an exemplary embodiment.

The format determination unit 120 of FIG. 1 compares disparities between three consecutive frames on the time axis, e.g., a first frame 1410 at a time t−1, a second frame 1420 at a time t, and a third frame 1430 at a time t+1, to determine whether these frames belong to a group consisting of the left-viewpoint video frames and the right-viewpoint video frames. Disparities among the frames 1410, 1420, and 1430 may be compared by using the following equations:

$$D_{FSQ} = [\text{diff}(t-1,t) + \text{diff}(t,t+1)] / [\text{diff}(t-1,t+1) + c] \qquad (9),$$

where $D_{FSQ}$ denotes a variation in the frames 1410, 1420, and 1430, and diff(t, t+1) denotes an absolute value of the difference between the pixel values of the second frame 1420 at the time t and the third frame 1430 at the time t+1.

$$\text{diff}(t-1,t) = |I_{t-1}(i,j) - I_t(i,j)|$$

$$\text{diff}(t,t+1) = |I_t(i,j) - I_{t+1}(i,j)|$$

$$\text{diff}(t-1,t+1) = |I_{t-1}(i,j) - I_{t+1}(i,j)| \qquad (10),$$

where $I_t(i,j)$ denotes a pixel value of the second frame 1420 at the time t.

That is, the variation $D_{FSQ}$ in the frames 1410, 1420, and 1430 is equal to the ratio of the sum of an absolute value diff(t−1, t) of the difference between a pixel 1415 at the time t−1 and a pixel 1425 at the time t and an absolute value diff(t, t+1) of the difference between the pixel 1425 at the time t and a pixel 1435 at the time t+1 to an absolute value diff(t−1, t+1) and the difference between the pixel 1415 at the time t−1 and the pixel 1435 at the time t+1.

If an input video sequence is a 2D video sequence, the difference values between the pixel values of each two adjacent frames do not change greatly from the first frame 1410 at the time t−1 to the second frame 1420 at the time t, and from the second frame 1420 at time t to the third frame 1430 at the time t+1. Thus, the variation $D_{FSQ}$ in the frames 1410, 1420, and 1430 has a value that is not large.

However, if the input video sequence is a 3D video frame having the frame sequential format, the first frame 1410 at the time t−1 and the third frame 1430 at the time t+1 are obtained from the same viewpoint but the second frame 1420 at the time t is obtained from a different viewpoint. Thus, an absolute value of the difference between the pixels of the first frame 1410 at the time t−1 and the third frame 1430 at the time t+1 is relatively small but absolute values of the difference values between the pixels of the first frame 1410 at the time t−1 and the second frame 1420 at the time t and between the second frame 1420 at the time t and the third frame 1430 at the time t+1 are relatively large. Accordingly, the variation $D_{FSQ}$ in the frames 1410, 1420, and 1430 is large.

Accordingly, the format determination unit 120 may calculate a variation value $D_{FSQ}$ of the frames of an input video sequence and determine a 3D video format of the input video sequence using the calculated variation value $D_{FSQ}$.

A method of determining whether a 3D video format is the frame sequential format is described above with reference to FIGS. 13A, 13B, and 14, but the 3D video having the field sequential format has similar characteristics to the 3D video having the frame sequential format and the format determination unit 120 may thus determine whether 3D video has the field sequential format by applying Equation (9) in units of fields of the 3D video.

The format determination unit 120 may check whether an error occurs in the results of determining a 3D video format of an input video sequence in units of frames, correct the error, and then finally determine the 3D video format, thereby increasing the precision of the result of determining the 3D video format. Methods of checking whether an error occurs in the results of determining a 3D video format of an input video sequence will now be described with reference to FIGS. 15 and 16.

Figure 15:
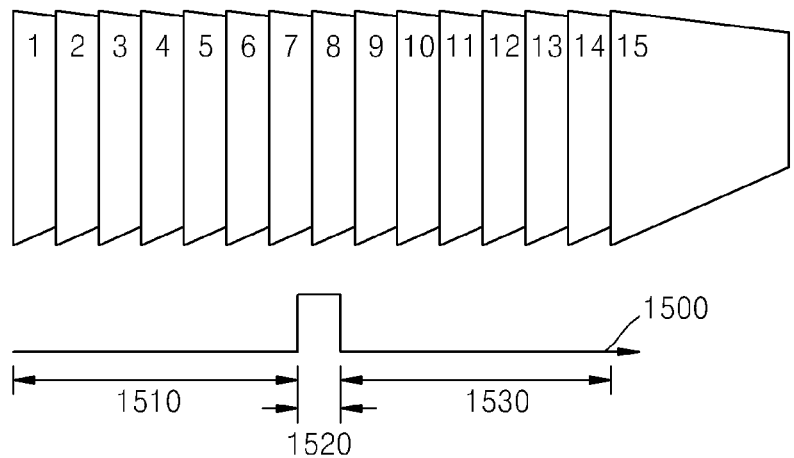
FIG. 15 illustrates a case where an error occurs when a 3D video format is determined.

FIG. 15 illustrates a case where an error occurs when a 3D video format is determined. When an input video sequence includes a first, second, . . . , fifteenth frame, the format determination unit 120 of FIG. 1 determines a 3D video format of each of these frames by using the disparity information or correlation information between the neighboring pixels. In results graph 1500 of determining the 3D video format of each of the first to fifteenth frames, the first to seventh frames are determined to have the side by side format in a first determination section 1510, the eighth frame is determined to have the top and bottom format in a second section determination 1520, and the ninth to fifteenth frames are determined to have the side by side format in a third determination section 1530.

If the input video sequence is transformed in formats according to the results 1500 such that the input video sequence can be displayed three-dimensionally, then a user may feel a sense of incongruity during 3D displaying of the eighth frame whose format is determined in the second determination section 1520 to be the top and bottom format when the first to fifteenth frames are displayed three-dimensionally. Accordingly, when the format of the 3D video is finally determined, the format of the eighth frame is changed from the top and bottom to the side by side format.

Figure 16:
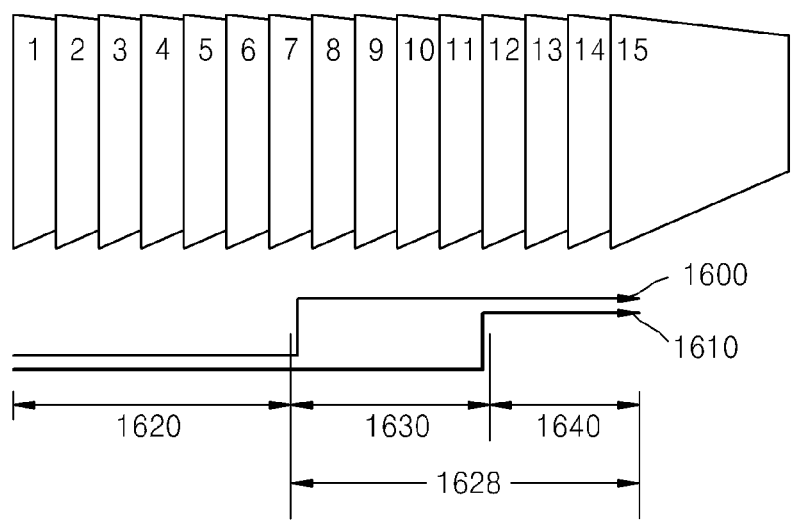
FIG. 16 illustrates a method of correcting an error occurring when a 3D video format is determined, according to an exemplary embodiment.

FIG. 16 illustrates a method of correcting an error occurring when a 3D video format is determined, according to an exemplary embodiment.

In the results graph 1600 of determining a 3D video format of each of a first, second, . . . , fifteenth frame of an input video sequence by the format determination unit 120 of FIG. 1, based on the disparity information or correlation information regarding the neighboring pixels, the first to seventh frames are determined to have the side by side format in a fourth determination section 1620, and the eighth to fifteenth frames are determined to have the top and bottom format in a fifth determination section 1628.

In this case, after the format determination unit 120 determines the first to seventh frames to have the side by side format in the fourth determination section 1620, when the 3D video format of the input video sequence is switched from the side by side format to the top and bottom format when the 3D video format of the eighth frame is determined, the format determination unit 120 does not directly determine the eighth frame to have the top and bottom format and further checks the result of determining a 3D video format of a predetermined number of consecutive frames in a check section 1630.

For example, if in the check section 1630, the result of determining a 3D video format of each of four consecutive frames, i.e., the eighth to eleventh frames, reveals that they have the top and bottom format, then the result of determining the 3D video format of the twelfth to fifteenth frames may be finally determined to be the 3D video format of the input video sequence. Alternatively, the 3D video format determined in the check section 1630 is definitely changed from the top and bottom format to the side by side format to keep the determination results determined previously in the fourth determination section 1620.

Accordingly, in the results graph 1610 of definitely determining the 3D video format of the input video sequence, the first to eleventh frames are finally determined to have the side by side format and the twelfth to fifteenth frames are finally determined to have the top and bottom format, unlike in the results 1600.

If determination results of the fourth determination section 1620 and the check section 1630 are switches, the check section 1630 maintains the determination result of the check section 1630 to be the determination result of the fourth determination section 1620 to prevent a sudden change in the 3D video format from causing an error or from degrading a stereoscopic effect. Length of the check section 1630 is determined to be quite shorter than that of the input video sequence. Although format transformation of a predetermined number of frames checked in the check section 1630 is delayed, format transformation and displaying may be more stably performed in a case when a format determination error occurs.

Figure 17:
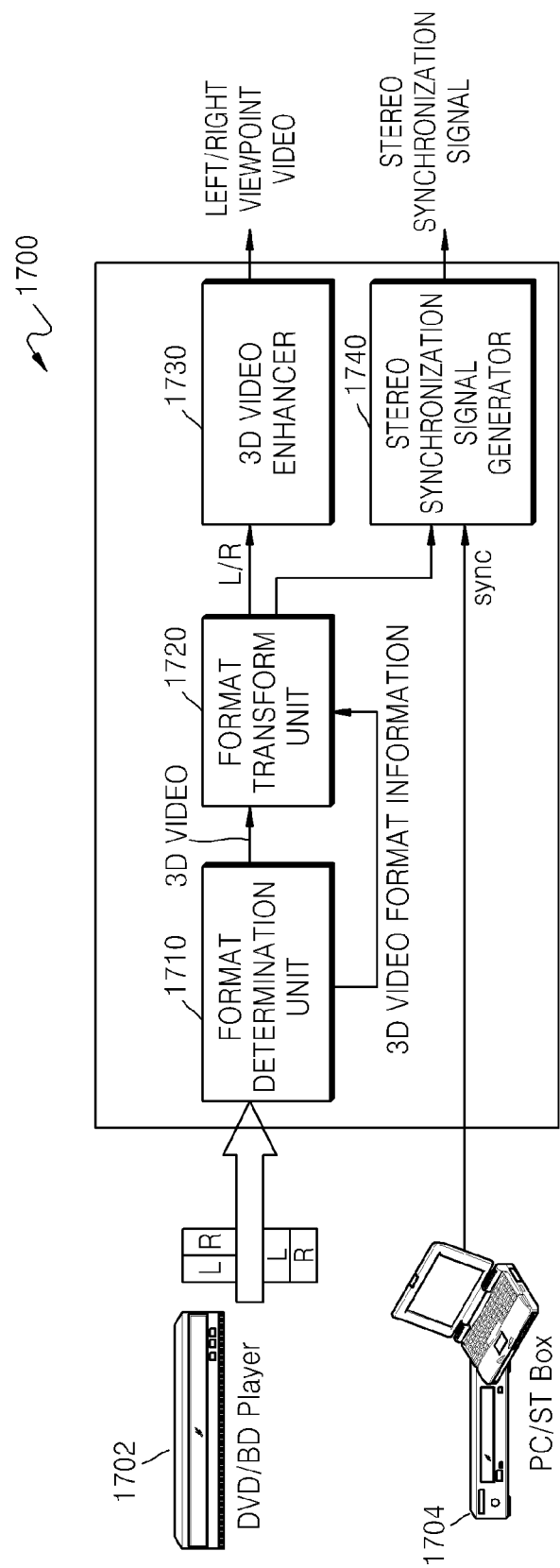
FIG. 17 is a block diagram illustrating post-processing involving format transformation and 3D displaying, according to an exemplary embodiment.

FIG. 17 is a block diagram illustrating post-processing involving format transformation and 3D displaying, according to an exemplary embodiment.

If a 3D video format transforming apparatus 100 according to an exemplary embodiment is installed in a 3D television (TV) system 1700, the 3D TV system 1700 is capable of automatically sensing and transforming a 3D video format of input video and displaying the input video three-dimensionally.

In the 3D TV system 1700, if 3D video is input from a source device, such as a digital versatile disc player (DVD)/Blu-ray Disc (BD) player 1702, a personal computer (PC) or a set-top box 1704, then the 3D video is sequentially supplied to a format determination unit 1710 and a format transform unit 1720 which are 3D integrated circuits (3DICs) and is then transformed into formats so that the 3D video may be displayed three-dimensionally.

The format determination unit 1710 analyzes the 3D video and determines a 3D video format thereof, and supplies information regarding the 3D video format to the format transform unit 1720 so that the format transform unit 1720 may perform format transformation.

The result of transforming the left-viewpoint video and the right-viewpoint video of the 3D video by the format transform unit 1720 is supplied to a 3D video enhancer 1730, so that the post-processing is performed to improve the quality of the 3D video or to reduce a sense of fatigue that users may feel when they view the 3D video displayed. Then, the final left-viewpoint video and the final right-viewpoint video are supplied to a display device (not shown). In this case, a stereo synchronization signal generator 1740 generates and outputs a stereo synchronization signal by using the result of transforming the left-viewpoint video and the right-viewpoint video, which is received from the format transform unit 1720, and by using a synchronization signal received from the source device, so that the left-viewpoint video and the right-viewpoint video can be displayed while being synchronized with each other.

In an exemplary embodiment, as described above, the 3D video format transforming apparatus 100 may be embodied as hardware to be installed in a 3D display system, and methods of determining and transforming a 3D video format that are performed by the 3D video format transforming apparatus 100 may be embodied as software, such as a graphics device driver for use in a PC.

Figure 18:
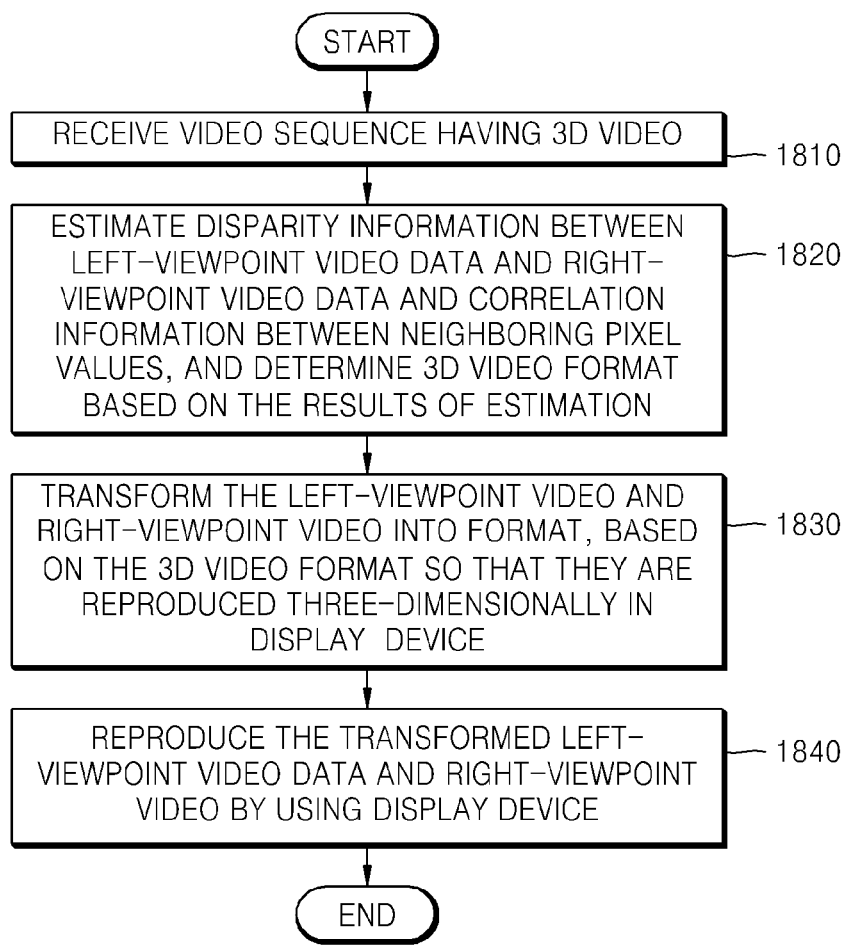
FIG. 18 is a flowchart illustrating a method of transforming a 3D video format, according to an exemplary embodiment.

FIG. 18 is a flowchart illustrating a method of transforming a 3D video format, according to an exemplary embodiment. Referring to FIG. 18, in operation 1810, a video sequence with 3D video having the left-viewpoint video and the right-viewpoint video is received.

In operation 1820, at least one of disparity information between the left-viewpoint video and the right-viewpoint video and correlation information between the neighboring pixel values is estimated, and a 3D video format of the 3D video is determined based on the result of estimation.

In operation 1830, the left-viewpoint video and the right-viewpoint video are transformed into a format, based on the 3D video format, so that they can be displayed three-dimensionally.

In operation 1840, the transformed left-viewpoint video and right-viewpoint video are reproduced three-dimensionally by using a display device.

The method of transforming a 3D video format, which is illustrated in FIG. 18, may be embodied as hardware by using the 3D video format transforming apparatus 100 of FIG. 1 as described above with reference to FIGS. 1 to 17.

Figure 19A:
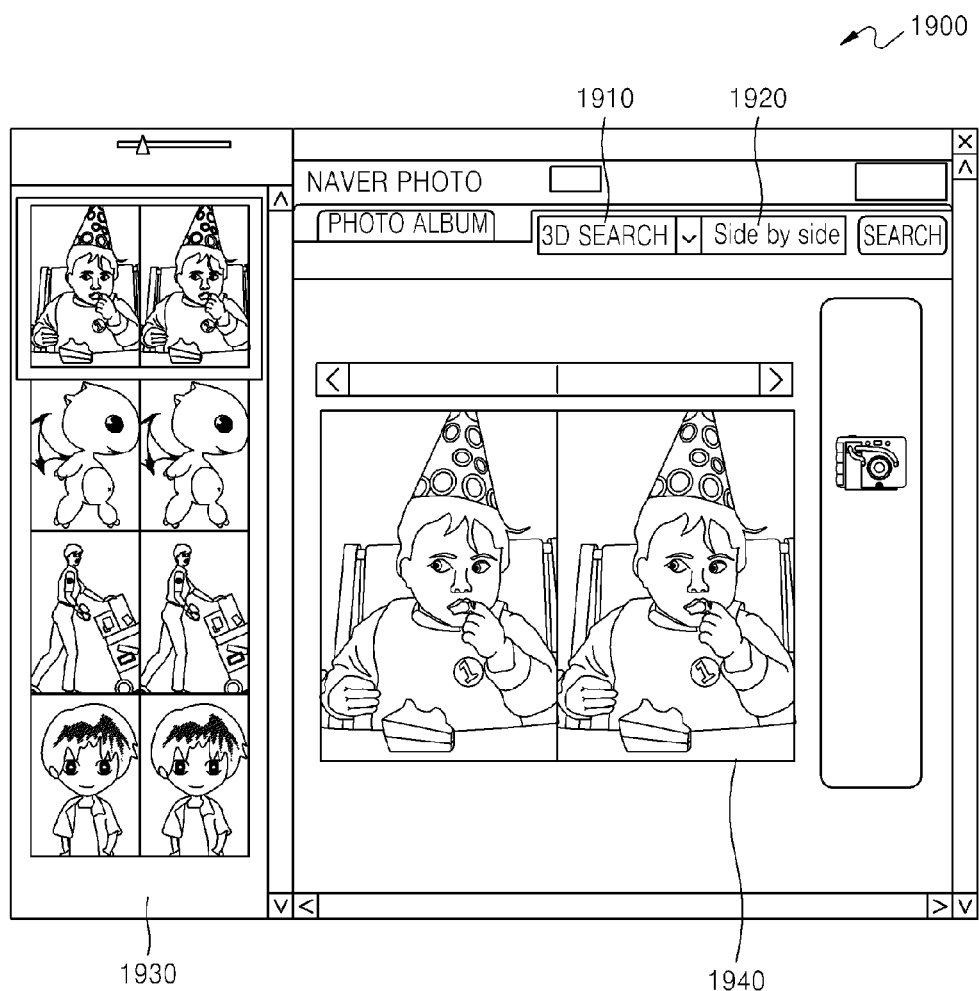
FIG. 19A illustrates a method of searching an Internet website for 3D video content having a 3D video format, according to an exemplary embodiment.

FIG. 19A illustrates a method of searching an Internet website for 3D video content having a 3D video format, according to an exemplary embodiment.

In a method of transforming a 3D video format according to an exemplary embodiment, a 3D video web search service may be provided to search for a 3D video as the input video. Referring to FIG. 19A, a web browser window 1900 that supports a search for the 3D video includes a search function setting section 1910 and a search word input section 1920.

For example, when the 3D video having the side by side format is searched for, a '3D search' function is selected in the search function setting section 1910 and an expression, 'side by side' is input as a 3D video format in the search word input section 1920. Then, a list of the 3D videos having the side by side format is displayed in a search result window 1930. If a piece of a 3D video 1940 is selected from the list of 3D videos, the 3D video 1940 is displayed in a main window of the web browser window 1900.

In a method of transforming a 3D video format according to an exemplary embodiment, a 3D video web search service may be performed to search an Internet website for the 3D video having a desired 3D video format and provide the 3D video to a user.

Figure 19B:
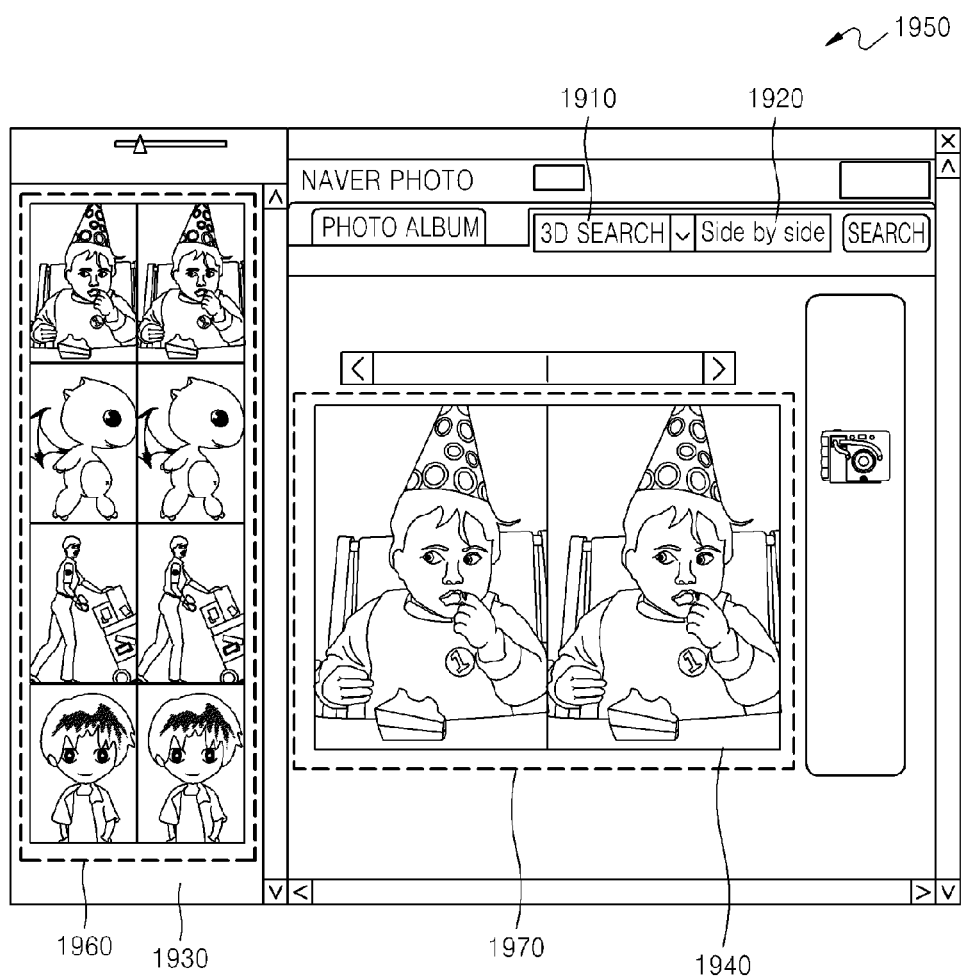
FIG. 19B illustrates a method of reproducing 3D video content having a 3D video format in a web, according to an exemplary embodiment.

FIG. 19B illustrates a method of reproducing the 3D video content having a 3D video format in a web, according to an exemplary embodiment.

When a mixture of 2D video and 3D video is displayed in a web browser window 1950 by using a method of transforming a 3D video format according to an exemplary embodiment, the 2D video may be displayed two-dimensionally and the 3D video may be displayed three-dimensionally.

A 3D video format of the 3D video may be determined using a 3D video format determination algorithm. In the web browser window 1950, a list 1930 of detected 3D video and video 1940 selected from the list 1930 are all 3D video but the other parts displayed are all 2D video. In order to display only 3D video three-dimensionally, the following methods may be used.

As an example, a 3D video format transform unit may provide location information regarding 3D video parts 1960 and 1970, e.g., the coordinates thereof, to a display processing module of a web browser so that the web browser can display the 3D video parts 1960 and 1970 three-dimensionally in the web browser window 1950.

As an example, the 3D video format transform unit may analyze the web browser window 1950 to determine the location of the 3D video parts 1960 and 1970, and display only the 3D video parts 1960 and 1970 three-dimensionally. According to the above examples of displaying the 3D video in a web browser window, even if a mixture of 2D video and 3D video is displayed in the web browser window, a user may view the 3D video three-dimensionally.

The above described exemplary embodiments may be embodied as a computer program. The computer program may be stored in a non-transitory computer-readable recording medium, and executed using a general digital computer. Examples of the computer-readable medium include a magnetic recording medium (a ROM, a floppy disc, a hard disc, etc.), and an optical recording medium (a CD-ROM, a DVD, etc.). While exemplary embodiments have been particularly shown and described, it will be understood by those of ordinary skill in the art that various changes in form and details may be made therein without departing from the spirit and scope of the present invention as defined by the following claims.

What is claimed is:

1. A method of transforming a format of three-dimensional (3D) video, the method comprising:
receiving a video sequence comprising 3D video that includes left-viewpoint video and right-viewpoint video;
estimating at least one of disparity information between the left-viewpoint video and the right-viewpoint video, and correlation information between neighboring pixel values of the left-viewpoint video and the right-viewpoint video;
determining a 3D video format of the 3D video based on a result of the estimating;
transforming the left-viewpoint video and the right-viewpoint video into a format from the determined 3D video format;
displaying the transformed left-viewpoint video and the transformed right-viewpoint video three-dimensionally on a display device;
determining, from a plurality of the 3D video, first secutive frames to be a first format and second consecutive frames, a predetermined number of frames subsequent to the first frames, to be a second format;
determining 3D video formats of remaining third consecutive frames. subsequent to the second frames, to be the first format; and
changing the 3D video format of the second frames from the second format to the first format.

2. The method of claim 1, wherein the determining the 3D video format comprises determining whether the 3D video format is one of a side by side format, a top and bottom format, a horizontal line interleaved format, and a vertical line interleaved format based on the disparity information between the left-viewpoint video and the right-viewpoint video.

3. The method of claim 1, wherein the determining the 3D video format comprises determining whether the 3D video format is one of a horizontal line interleaved format, a vertical line interleaved format, and a checker board format, based on the correlation information between the neighboring pixel values of the left-viewpoint video and the right-viewpoint video.

4. The method of claim 1, wherein the determining the 3D video format further comprises:
determining whether the 3D video format is one of a horizontal line interleaved format, a vertical line interleaved format, and a checker board format based on the correlation information between the neighboring pixel values of the left-viewpoint video and the right-viewpoint video; and
determining whether the 3D video format is one of a field sequential format and a frame sequential format, based on the disparity information.

5. The method of claim 1, wherein the determining the 3D video format further comprises determining whether the 3D video format is one of a side by side format and a top and bottom format by detecting a boundary line between the left-viewpoint video and the right-viewpoint video.

6. The method of claim 1, wherein the determining the 3D video format comprises determining the 3D video format of the 3D video in a region that has texture of the 3D video by detecting the region having texture, and calculating a smoothness of corresponding regions of the left-viewpoint video and the right-viewpoint video.

7. The method of claim 2, wherein the determining the 3D video format further comprises:
dividing a frame of the 3D video into equal upper and lower regions;
estimating first disparity information by using an upper and lower differential image that represents an absolute value of a difference value between the upper and lower regions;
dividing the frame of the 3D video into equal left and right regions; and
estimating second disparity information by using a left and right differential image that represents an absolute value of a difference value between the left and right regions.

8. The method of claim 7, wherein the determining of the 3D video format comprises determining whether the 3D video format is the top and bottom format or the side by side format, based on the first disparity information and the second disparity information.

9. The method of claim 2, wherein the determining the 3D video format further comprises:
dividing vertical lines of the frame of the 3D video into an odd-numbered vertical line and an even-numbered vertical line;
estimating third disparity information by using a vertical line differential image that represents an absolute value of a difference value between the odd-numbered vertical line and the even-numbered vertical line;
dividing horizontal lines of the frame of the 3D video into an odd-numbered line and an even-numbered horizontal line; and
estimating fourth disparity information by using a horizontal line differential image that represents an absolute value of a difference value between the odd-numbered horizontal line and the even-numbered horizontal line.

10. The method of claim 9, wherein the determining the 3D video format further comprises:
determining whether the 3D video format is one of the top and bottom format and the side by side format based on the first and the second disparity information and providing a first determination result; and
determining whether the 3D video format is one of the vertical line interleaved format and the horizontal line interleaved format based on the third disparity information and the fourth disparity information and providing a second determination result.

11. The method of claim 8, wherein the determining the 3D video format further comprises:
if a width of a first section, in which values of consecutive pixels in the upper and lower differential image are greater than a first threshold, is greater than a first section disparity value, selecting the first section as a first candidate section of the first disparity information; and
if the width of a second section, in which values of consecutive pixels of the left and right differential image are greater than a second threshold, is greater than a second section disparity value, selecting the second section as a second candidate section of the second disparity information.

12. The method of claim 11, wherein the determining the 3D video format further comprises:
comparing a total number of first candidate sections of the first disparity information with a total number of the second candidate sections of the second disparity information;

determining that the 3D video format is the top and bottom format if the total number of the first candidate sections of the first disparity information is less than the total number of the second candidate sections of the second disparity information; and determining that the 3D video format is the side by side format if the total number of the first candidate sections of the first disparity information is greater than the total number of the second candidate sections of the second disparity information.

13. The method of claim 12, wherein the determining of the 3D video format further comprises:

if the width of a third section, in which values of consecutive pixels of the vertical line differential image are greater than a third threshold, is greater than a third section disparity value, selecting the third section as a third candidate section of the third disparity information; and if the width of a fourth section, in which values of consecutive pixels of the horizontal line differential image are greater than a fourth threshold, is greater than a fourth section disparity value, selecting the fourth section as a fourth candidate section of the fourth disparity information.

14. The method of claim 13, wherein the determining the 3D video format further comprises:

comparing a total number of third candidate sections of the third disparity information with a total number of fourth candidate sections of the fourth disparity information;

determining that the 3D video format is the vertical line interleaved format if the total number of the third candidate sections of the third disparity information is greater than the total number of the fourth candidate sections of the fourth disparity information;

determining that the 3D video format is the horizontal line interleaved format if the total number of the third candidate sections of the third disparity information is less than the total number of the fourth candidate sections of the fourth disparity information.

15. The method of claim 3, wherein the determining the 3D video format further comprises:

estimating first correlation values between values of first, second, and third pixels of the 3D video that are consecutive in a horizontal direction; and estimating second correlation values between values of fourth, fifth, and sixth pixels of the 3D video that are consecutive in a vertical direction.

16. The method of claim 15, wherein the determining the 3D video format further comprises:

determining the 3D video format to be the vertical line interleaved format if a total number of the first correlation values, which are greater than a correlation threshold, is greater than a predetermined format threshold and a total number of the second correlation values, which are greater than the correlation threshold, is less than the predetermined format threshold;

determining the 3D video format to be the horizontal line interleaved format if the total number of the first correlation values, which are greater than the correlation threshold, is less than the predetermined format threshold and the total number of the second correlation values, which are greater than the correlation threshold, is greater than the predetermined format threshold; and determining the 3D video format to be the checker board format if the total number of the first correlation values, which are greater than the correlation threshold, and the total number of the second correlation values, which are greater than the correlation threshold, are greater than the predetermined format threshold.

17. The method of claim 15, wherein each of the first correlation values is a ratio of a sum of a second difference value and a third difference value and a first difference value, where the first difference value is an absolute value of a difference value between the first and third pixels, the second difference value is an absolute value of a difference value between the first and second pixels, and the third difference value is an absolute value of a difference value between the second and third pixels, and the second correlation values each is a ratio of a sum of a fifth difference value and a sixth difference value and a fourth difference value, where the fourth difference value is an absolute value of a difference value between the fourth and sixth pixels, the fifth difference value is an absolute value of a difference value between the fourth and fifth pixels, and the sixth difference value is an absolute value of a difference value between the fifth and sixth pixels.

18. The method of claim 4, wherein the determining the 3D video format further comprises estimating a change in a temporal disparity between first, second, and third consecutive frames of the 3D video on a time axis.

19. The method of claim 18, wherein the change in the temporal disparity between the first, second, and third consecutive frames is equal to a ratio of a sum of second differential frame data and third differential frame data and first differential frame data, wherein the first differential frame data is an absolute value of a difference value between the first and third frames, the second differential frame data is an absolute value of a difference value between the first and second frames, and the third differential frame data is an absolute value of a difference value between the second and third frames.

20. The method of claim 5, wherein the detecting the boundary line between the left-viewpoint video and the right-viewpoint video comprises:

dividing the 3D video frames each into equal upper and lower regions;

calculating ratios of a horizontal boundary line difference value and a sum of an upper horizontal boundary line difference value and a lower horizontal boundary line difference value of pixel groups each including adjacent first, second, third and fourth pixels, where the upper horizontal boundary line difference value is an absolute value of a difference value between the first and second pixels disposed above and perpendicular to a horizontal boundary line between the upper and lower regions, the lower horizontal boundary difference value is an absolute value of a difference value between the third and fourth pixels disposed below and perpendicular to the horizontal boundary line, and the horizontal boundary line difference value is an absolute value of a difference value between the second pixel disposed above and the third pixel disposed below the horizontal boundary line; and determining the 3D video to be the top and bottom format if a sum of the ratios is greater than a horizontal boundary line threshold.

21. The method of claim 5, wherein the detecting the boundary line between the left-viewpoint video and the right-viewpoint video comprises:

dividing the 3D video frames each into equal left and right regions;

calculating ratios of a vertical boundary line difference value and a sum of a left vertical boundary line difference value and a right vertical boundary line difference value of pixel groups each including adjacent first, second, third and fourth pixels, where the left vertical boundary line difference value is an absolute value of a difference value between the first and second pixels disposed perpendicular and to the left of a vertical boundary line between the left and right regions, the right vertical boundary difference value is an absolute value of a difference value between the third and fourth pixels disposed perpendicular and to the right of the vertical boundary line, and the vertical boundary line difference value is an absolute value of a difference value between the second and third pixels disposed to the left and to the right of the vertical boundary line, respectively; and determining the 3D video to be the side by side format if a sum of the ratios is greater than a vertical boundary line threshold.

22. The method of claim 5, wherein the 3D video has a boundary region, which surrounds the boundary line and includes at least a number of black lines, and the determining the 3D video format further comprises determining the 3D video format of the 3D video while excluding the boundary region from the determining.

23. The method of claim 1, wherein the determining the 3D video format of remaining third consecutive frames comprises:
determining the remaining third consecutive frames, subsequent to the second frames, having the second format;
wherein the changing the 3D video format of the second frames comprises checking whether at least a predetermined number of the third frames has the second format; and
if at least the predetermined number of the third frames have the second format, changing the 3D video format of the second frames to the first format, and finally determining the third frames to have the second format.

24. The method of claim 1, further comprising searching an Internet website for 3D video content by using a selected 3D video format as a keyword,
wherein the receiving the video sequence comprises receiving the 3D video content searched for in the web.

25. The method of claim 24, wherein the searching the web for the 3D video content comprises searching for the video content that is a mixture of two-dimensional (2D) video and the 3D video,
the receiving the video sequence further comprises receiving the 2D and 3D video content searched for in the web,
the transforming the left-viewpoint video and the right-viewpoint video of the 3D video into the format further comprises transforming the left-viewpoint video and the right-viewpoint video into the format to be reproduced three-dimensionally based on the selected 3D video format used as the keyword, and
the method further comprises reproducing the 2D video of the video sequence two-dimensionally, and reproducing the 3D video of the video sequence three-dimensionally in the format into which the 3D video is transformed.

26. The method of claim 25, further comprising:
receiving location information of the 3D video transmitted from a provider of the 3D video content to a web browser; and
estimating, by the web browser, at least one of the disparity information and the correlation information between the neighboring pixel values, determining the 3D video format of the 3D video, transforming the 3D video into the format, and reproducing the 3D video three-dimensionally.

27. The method of claim 25, further comprising detecting location of the 3D video in the 3D video content, by a 3D display device,
wherein the 3D display device reproduces the transformed 3D video three-dimensionally at the location of the 3D video.

28. An apparatus for transforming a format of three-dimensional (3D) video, the apparatus comprising:
a video input unit which receives a video sequence comprising 3D video that includes left-viewpoint video and right-viewpoint video;
a format determination unit which estimates at least one of disparity information between the left-viewpoint video and the right-viewpoint video and correlation information between neighboring pixel values of the left-viewpoint video and the right-viewpoint video, and determines the 3D video format of the 3D video based on a result of the estimation;
a format transform unit which transforms the left-viewpoint video and the right-viewpoint video into a format, from the determined 3D video format; and
a display unit which displays the transformed left-viewpoint video and the transformed right-viewpoint video three-dimensionally on a display device,
wherein the format determination unit;
determines, from a plurality of frames of the 3D video, first consecutive frames to be a first format and second consecutive frames, a predetermined number of frames subsequent to the first frames, to be a second format,
determines 3D video formats of remaining third consecutive frames subsequent to the second frames, to be the first format, and
changes the 3D video format of the second frames from the second format to the first format.

29. A non-transitory computer-readable recording medium storing a computer program which, when executed by a computer, causes the computer to execute a method of transforming a format of three-dimensional (3D) video, the method comprising:
receiving a video sequence comprising 3D video that includes left-viewpoint video and right-viewpoint video;
estimating at least one of disparity info ation between the left-viewpoint video and the right-viewpoint video, and correlation infornnudnn between neighboring pixel values of the left-viewpoint video and the right-viewpoint video;
determining a 3D video format of the 3D video based on a result of the estimating;
transforming the left-viewpoint video and the right-viewpoint video into a format from the determined 3D video format;
displaying the transformed left-viewpoint video and the transformed right-viewpoint video three-dimensionally on a display device;
determining, from a plurality of frames of the 3D video, first consecutive frames to be a first format and second consecutive frames, a predetermined number of frames subsequent to the first frames, to be a second format;
determining 3D video formats of remaining third consecutive frames, subsequent to the second frames, to be the first format; and
changing the 3D video format of the second frames from the second format to the first format.

* * * * *